United States Patent
Blackwell-Thompson et al.

(10) Patent No.: US 6,905,097 B2
(45) Date of Patent: Jun. 14, 2005

(54) LAUNCH VEHICLE PAYLOAD CARRIER AND RELATED METHODS

(75) Inventors: Judith C. Blackwell-Thompson, Merritt Island, FL (US); John A. Graves, Titusville, FL (US); Anita E. Gale, Nassau Bay, TX (US); Dilip K. Darooka, Blue Bell, PA (US); Cory Bird, Mojave, CA (US)

(73) Assignee: The Boeing Company, Chicago, IL (US)

( * ) Notice: Subject to any disclaimer, the term of this patent is extended or adjusted under 35 U.S.C. 154(b) by 58 days.

(21) Appl. No.: 10/397,499

(22) Filed: Mar. 26, 2003

(65) Prior Publication Data

US 2004/0016846 A1 Jan. 29, 2004

Related U.S. Application Data

(60) Provisional application No. 60/397,835, filed on Jul. 23, 2002.

(51) Int. Cl.$^7$ .............................................. B64G 1/22
(52) U.S. Cl. ................................... 244/161; 244/158 R
(58) Field of Search ......................... 244/158 R, 118.1, 244/161, 137.1; 248/132, 127, 146, 147, 346.01, 671

(56) References Cited

U.S. PATENT DOCUMENTS

| 4,043,524 A | * | 8/1977 | Dreyer et al. ............. 244/118.1 |
|---|---|---|---|
| 4,044,974 A | | 8/1977 | Lingley et al. ............. 244/161 |
| 4,082,240 A | * | 4/1978 | Heathman et al. ...... 244/158 R |
| 4,290,570 A | | 9/1981 | Smolik et al. .......... 244/158 R |
| 4,324,374 A | | 4/1982 | Wittmann et al. ...... 244/158 R |
| 4,395,005 A | * | 7/1983 | Ganssle ..................... 244/161 |
| 4,600,169 A | * | 7/1986 | Koster et al. ............. 244/118.1 |
| 4,711,417 A | * | 12/1987 | Steffy ...................... 244/158 R |
| 4,771,971 A | | 9/1988 | Ludwig et al. ......... 244/158 R |
| 4,776,539 A | | 10/1988 | Byers et al. ............. 244/158 R |
| 4,789,118 A | | 12/1988 | Byers ...................... 244/158 R |
| 5,346,165 A | * | 9/1994 | Frean et al. ................ 248/146 |
| 5,806,799 A | * | 9/1998 | Lounge .................. 244/158 R |
| 5,848,766 A | | 12/1998 | Thompson .............. 244/158 R |
| 6,224,020 B1 | * | 5/2001 | Hopkins et al. ........ 244/158 R |
| 6,367,615 B1 | * | 4/2002 | Helmner .................. 198/750.1 |

* cited by examiner

*Primary Examiner*—Tien Dinh
(74) *Attorney, Agent, or Firm*—Harness, Dickey & Pierce, P.L.C.

(57) ABSTRACT

A modular payload carrier for use in a launch vehicle includes at least one module configured to fit in a payload bay of the vehicle and attachable to at least one other module configured to fit in the bay. The module includes an outer wall contoured generally to fit a bottom surface contour of the bay. The carrier can be used for the manifesting of both deployable and non-deployable payloads. Processing of payloads with the carrier can be performed, in large part, separately from launch vehicle processing. Thus launch costs and turnaround times can be reduced.

17 Claims, 21 Drawing Sheets

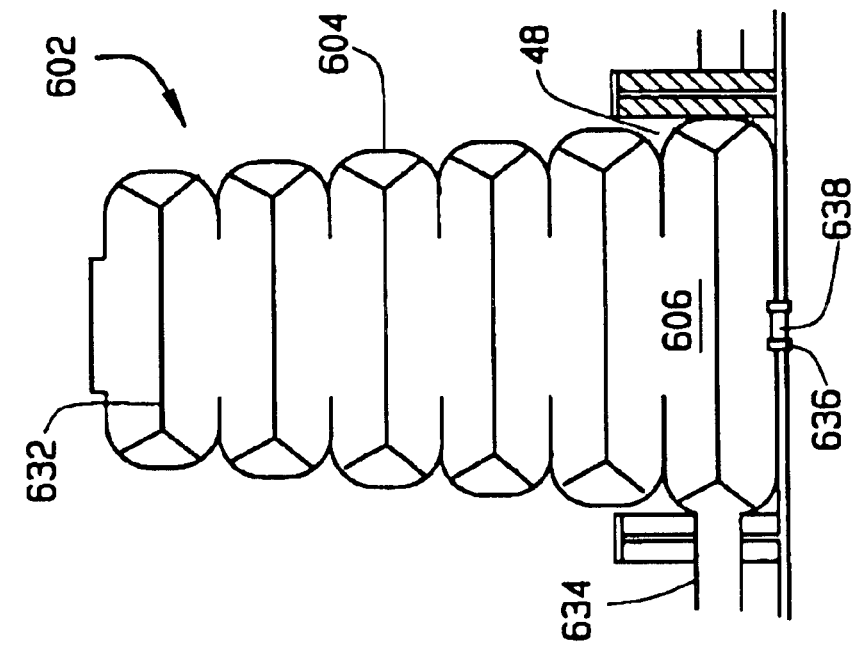
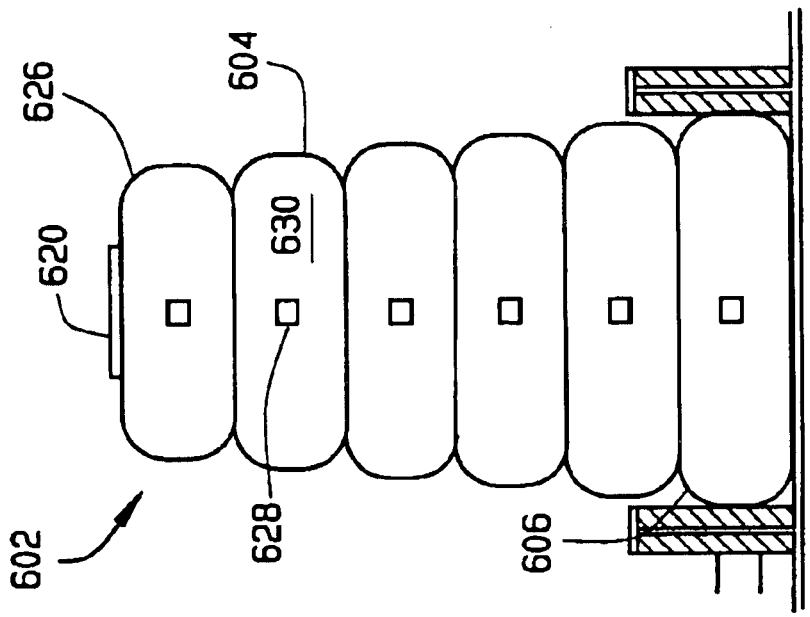

LAUNCH VEHICLE PAYLOAD CARRIER AND RELATED METHODS

CROSS-REFERENCE TO RELATED APPLICATIONS

This application claims the benefit of U.S. Provisional Application No. 60/397,835, filed on Jul. 23, 2002.

STATEMENT REGARDING FEDERALLY SPONSORED RESEARCH OR DEVELOPMENT

This invention was made with Government support under Contract Number NAS-10-11400 awarded by the National Aeronautics and Space Administration. The Government has certain rights in this invention.

FIELD OF THE INVENTION

The present invention relates to launch vehicle payloads and, more particularly, to a modular payload carrier for use in a launch vehicle.

BACKGROUND OF THE INVENTION

Payloads carried aboard launch vehicles can vary widely as to size, function and system requirements. For example, a space shuttle orbiter of the National Space Transportation System (NSTS) can be equipped to carry, in its payload bay, configurations of Spacelab, developed by the National Aeronautics and Space Administration (NASA) and the European Space Agency (ESA). Spacelab is modularly configured and can be varied to meet specific mission requirements. Spacelab can include a pressurized module containing a laboratory, one or more open pallets that expose materials and equipment to space, a tunnel for accessing the pressurized module, and/or an instrument pointing subsystem. An orbiter cargo also could include, for example, one or more deployable spacecraft, medium-sized payloads and/or small self-contained payloads known as "getaway specials".

Payloads typically utilize a high percentage of limited launch vehicle capability and resources, e.g. weight, payload bay and/or fairing volume, avionics and/or power. Launch vehicle resource allocation and payload integration are complicated by the fact that launch vehicle customers frequently have unusual individual needs for payload services such as power, monitoring/commanding, attitude/pointing, contamination control, fluid services and active cooling. Thus, preparing payloads for flight and for integration with a launch vehicle usually is a lengthy and complicated process.

For most reusable launch vehicle missions, payload requirements are accommodated by reconfiguring the launch vehicle payload bay. Avionics, software and other systems also are reconfigured in accordance with new payload configurations and needs. Detailed compatibility analyses are commonly performed to ensure that the reconfigured systems function as needed for both launch vehicle and payload(s).

Payloads for space shuttle flights are processed through a series of facilities and testing procedures, and launch vehicle modifications also are subjected to testing. It typically becomes necessary to reconfigure payload ground handling equipment to process payloads at one or more payload processing facilities. Additionally, small non-deployable payloads to be mounted in a vehicle payload bay sidewall cannot be installed until relatively late in the integration process. Thus the time required to integrate payloads with a launch vehicle can be lengthy and subject to change. It would be desirable to eliminate the need to reconfigure a payload bay and ground handling equipment for each launch vehicle flight. It also would be desirable to reduce payload integration costs and timelines.

SUMMARY OF THE INVENTION

The present invention, in one preferred embodiment, is directed to a modular payload carrier for use in a launch vehicle. The carrier includes at least one module configured to fit in a payload bay of the vehicle and attachable to at least one other module configured to fit in the bay. The module includes an outer wall contoured generally to fit a bottom surface contour of the bay.

The above described carrier can be used for the manifesting of both deployable and non-deployable payloads. Processing of payloads for carriage in the above carrier can be performed, in large part, separately from launch vehicle processing. Using the above carrier can greatly reduce, and in some cases, eliminate, launch vehicle reconfiguration and customization work. Thus launch costs and turnaround times can be reduced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 20A is an elevational view of a fully deployed bag assembly according to one embodiment of the present invention;

FIG. 20B is a cross-sectional view of the bag assembly shown in FIG. 20A; and

DETAILED DESCRIPTION OF THE PREFERRED EMBODIMENTS

The following description of the preferred embodiment(s) is merely exemplary in nature and is in no way intended to limit the invention, its application, or uses. Although embodiments of the present invention are described with reference to a reusable launch vehicle, the invention is not so limited. Embodiments also are contemplated for use in other launch vehicles, including expendable launch vehicles.

Figure 1:
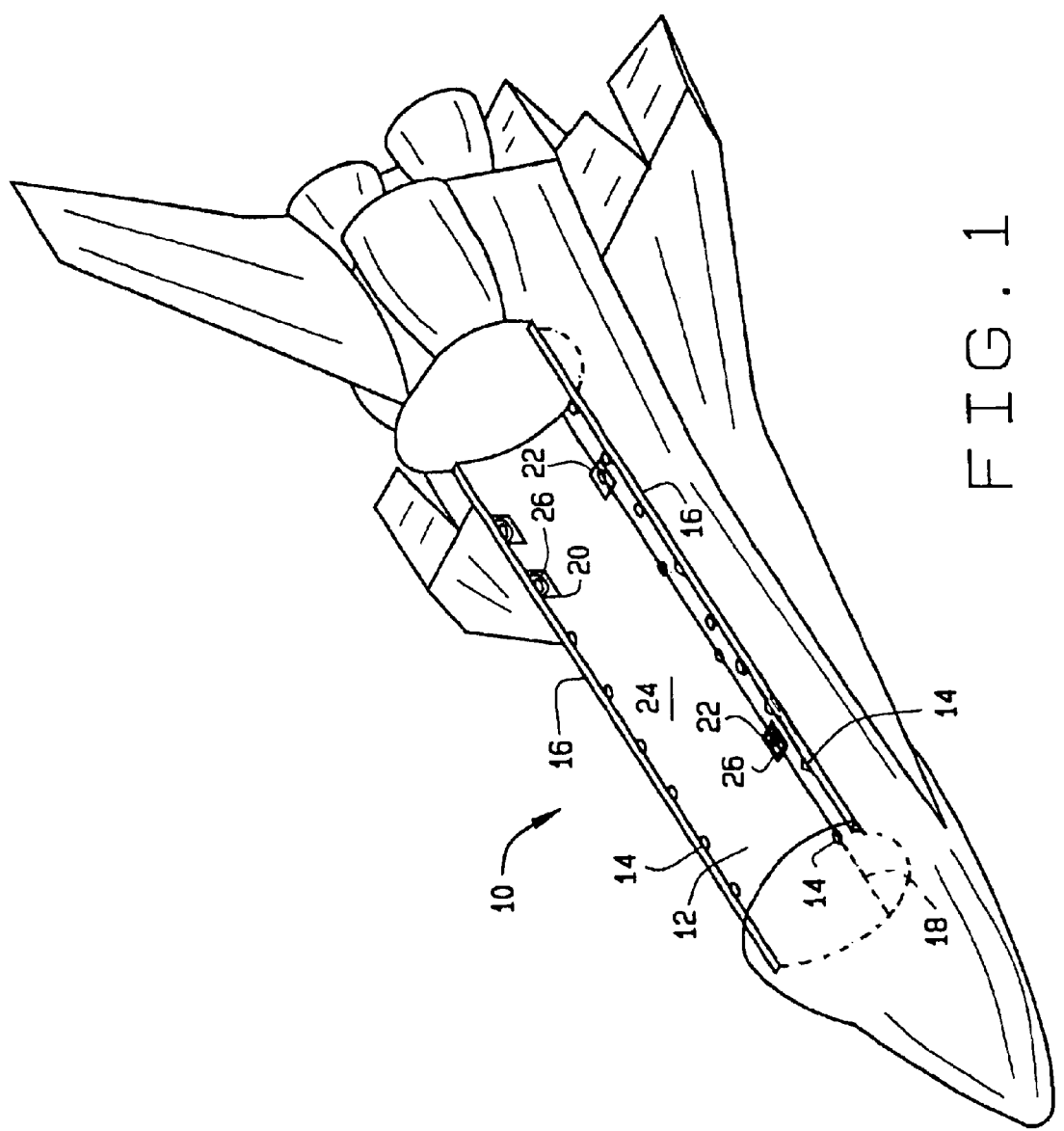
FIG. 1 is an illustration of a reusable launch vehicle.

An exemplary reusable launch vehicle is indicated generally by reference number 10 in FIG. 1. The vehicle 10, generally referred to as a space shuttle orbiter, is designed for launch into space via solid rocket boosters and a fuel tank which are jettisoned after launch. The vehicle 10 is equipped to carry various types of payloads into orbit around the earth and to deploy and/or retrieve payloads, e.g., satellites and/or other spacecraft. The vehicle 10 is further documented in the NSTS Shuttle Reference Manual (1988), available from the National Aeronautics and Space Administration (NASA).

Payloads are secured in a launch vehicle payload bay 12. A plurality of attachment points 14, spaced along two side longerons 16 and along a centerline keel 18, are available for securing a payload in the bay 12. A plurality of longeron bridge fittings 20 and keel bridge fittings 22 are attachable to a frame 24 of the payload bay respectively at appropriate longeron and keel attachment points 14. Payloads can be secured to the bridges 20 and 22 using active and/or passive retention devices or latches 26. Passive latches are used for securing non-deployable payloads, while deployable payloads are secured by motor-driven, active retention devices or latches. The payload retention devices 26 allow installation and removal of payloads when the launch vehicle 10 is positioned horizontally or vertically. The payload bay 12 is enclosed during flight by a pair of payload bay doors (not shown) which are opened for deployment of payload(s) into space.

Figure 2:
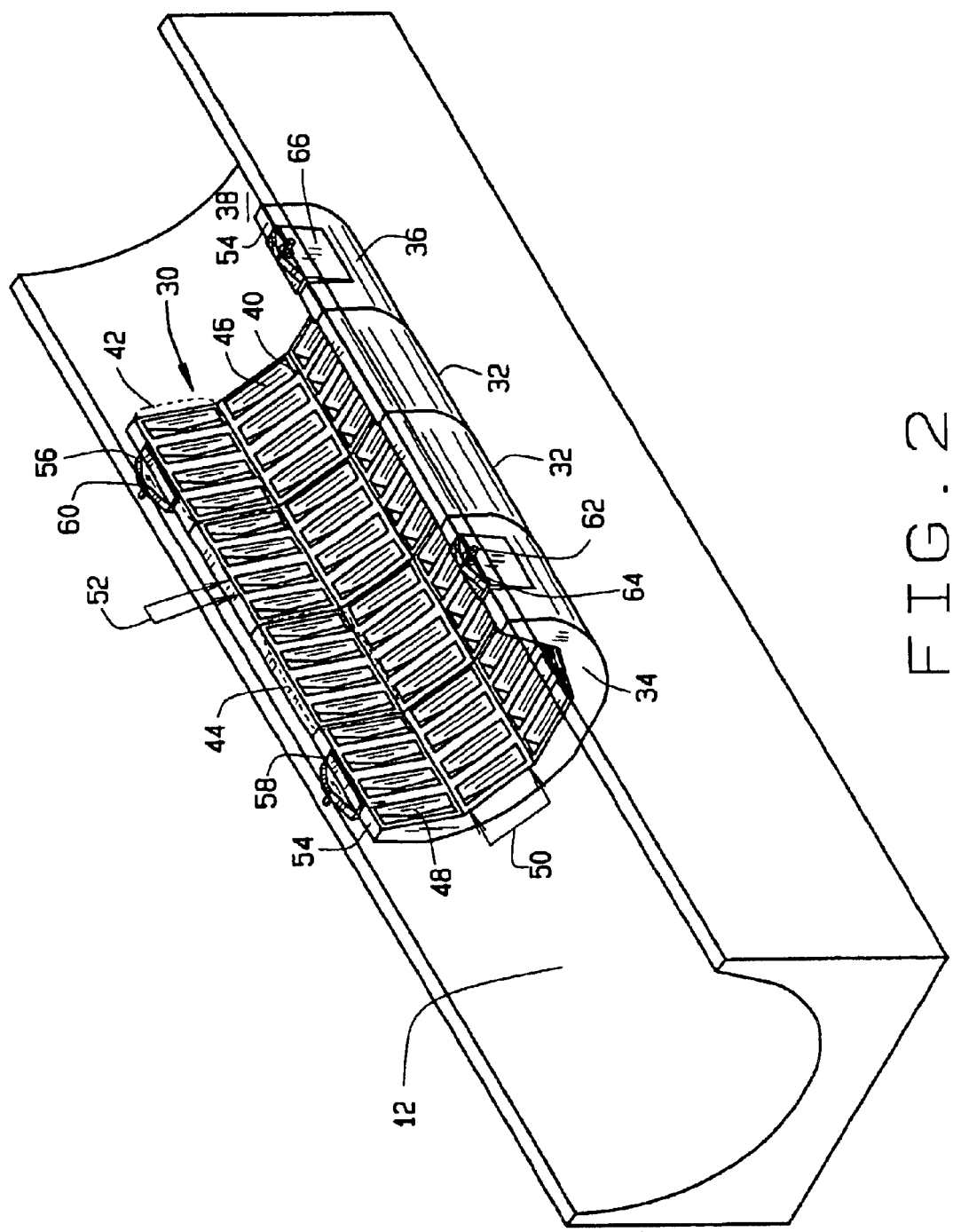
FIG. 2 is a perspective view of a modular payload carrier configured in a launch vehicle payload bay according to one embodiment of the present invention.

An embodiment of a modular payload carrier, configured for use in the launch vehicle 10, is indicated generally by reference number 30 in FIG. 2. The carrier 30 includes at least one module 32 configured to fit in the payload bay 12 and attachable to at least one other module 32 configured to fit in the payload bay 12. In the embodiment shown in FIG. 2, the carrier includes four modules 32 joined together along module end walls 34.

Each module has an outer wall 36 contoured generally to fit a bottom surface contour 38 of the payload bay 12. The term "fit" is used herein and in the claims to mean that the outer wall 36 conforms generally to, but does not touch, the contour 38. A segmented inner wall 40 of each module has a plurality of segments or faces 42, each face punctuated by a row 44 of rectangular openings 46 into compartments 48 defined between each face 42 and the outer wall 36. The compartments 48 are configured, for example, to hold payloads as further described below. The openings 46 are all of equal length 50 and width 52. Embodiments also are contemplated, however, in which the openings 46 vary in size.

The outer wall 36 and inner wall 40 extend between the end walls 34 and between two upper edges 54 of each module. A plurality of trunnion fittings 56 are selectively spaced along the carrier upper edges 54. A lip 58 of each trunnion fitting extends along the associated upper edge 54. Each trunnion fitting 56 includes a tower 60 extending upwardly from the lip 58, and a trunnion 62 extending outwardly from an outer side 64 of the tower 60. A bracket 66 extends downwardly from the trunnion tower 60 and lip 58.

Figure 3:
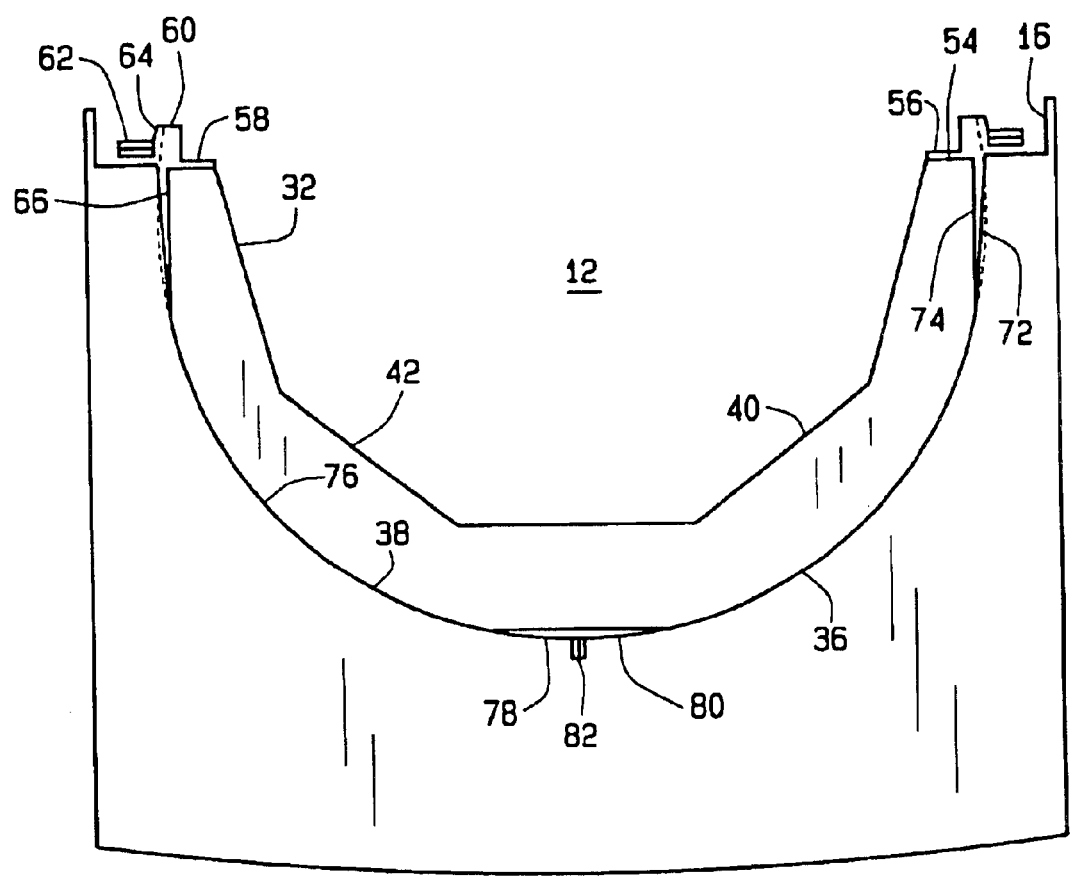
FIG. 3 is a transverse cross-sectional view of an embodiment of a carrier module in a payload bay.

FIG. 3 is a transverse cross-sectional view of a module 32 in the payload bay 12. Each trunnion bracket 66 has a flat face 72 abutting a flat section 74 of the module outer wall 36. The bracket 66 has a graduated thickness so as to fit between, while maintaining clearance between, the flat section 74 and a payload bay inner surface 76. Each trunnion 62 extends toward, and can be secured to, a longeron bridge 20 (shown in FIG. 1) using an active or passive launch vehicle latch 26 (shown in FIG. 1).

At least one keel trunnion fitting 78 includes an attachment plate 80 affixed to the module outer wall 36 and contoured generally to fit the bottom surface contour 38 of the payload bay 12. A trunnion 82 extends downwardly from the plate 80 into an associated launch vehicle keel bridge fitting 22 and latch 26 (shown in FIG. 1). The plate 80 is selectively positioned for attaching the trunnion 82 relative to keel attachment points 14.

Figure 4A:
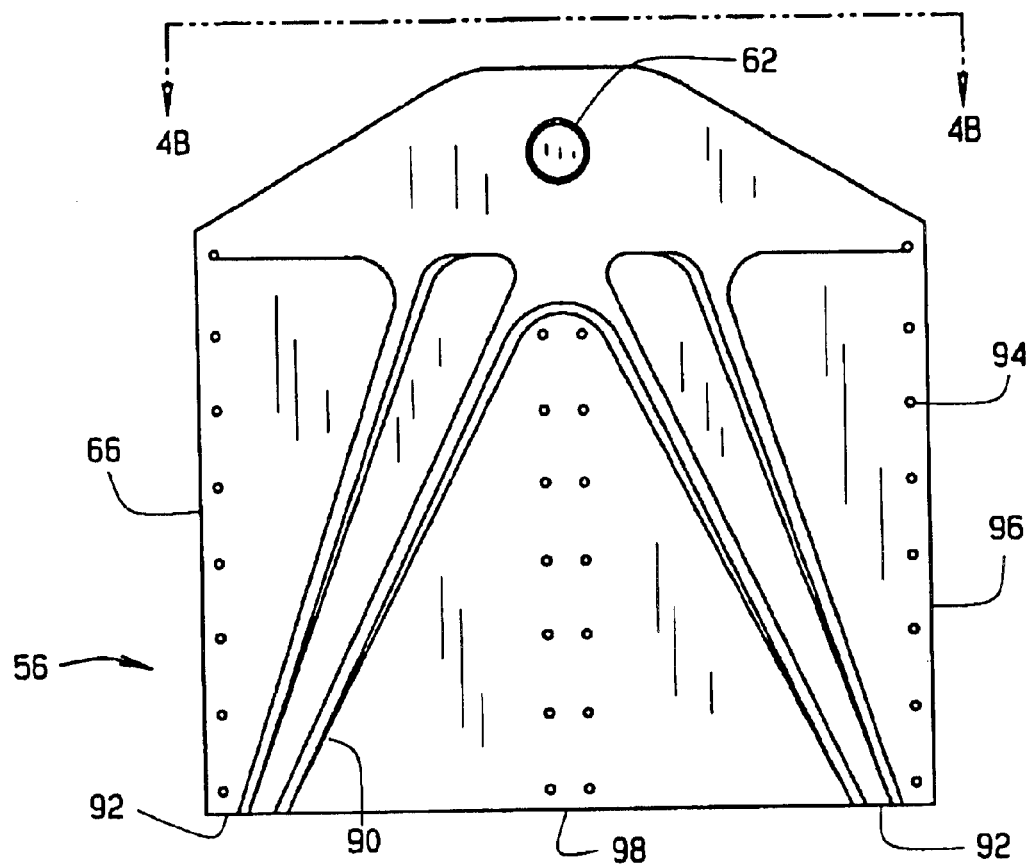
FIG. 4A is a longitudinal view of a carrier trunnion fitting according to one embodiment of the present invention.
Figure 4B:
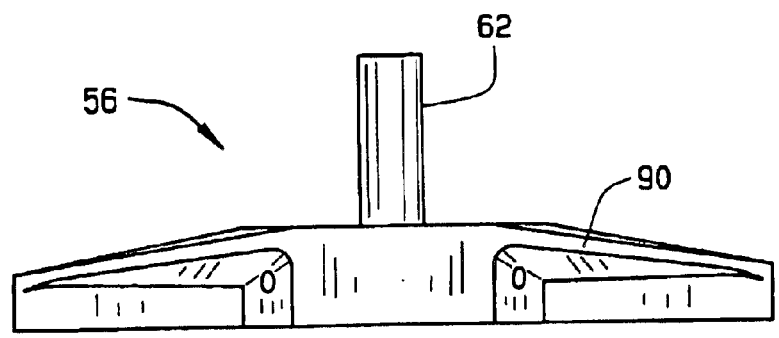
FIG. 4B is a view of the carrier trunnion fitting shown in FIG. 4A, taken along the plane indicated by line 4B—4B in FIG. 4A.

The trunnion fitting 56 is shown in greater detail in FIGS. 4A and 4B. The trunnion fitting 56 is fabricated of machined metal, e.g. titanium or aluminum. FIG. 4A is a longitudinal view of the fitting 56. (The terms "longitudinal" and "transverse" are defined and used, herein and in the claims, with reference to the launch vehicle 10.) FIG. 4B is a view of the fitting 56 taken along the plane indicated by line 4B—4B in FIG. 4A. The bracket 66 is reinforced by a plurality of raised ridges 90 extending generally from the trunnion 62 toward lower corners 92 of the bracket. The bracket 66 can be secured to the payload bay 12 through holes 94 along the sides 96 and middle 98 of the bracket. Other embodiments of trunnion fittings may be configured to secure payloads. For example, to secure relatively light payloads, it can be beneficial to use trunnion fittings lighter than the fittings 56.

Figure 5:
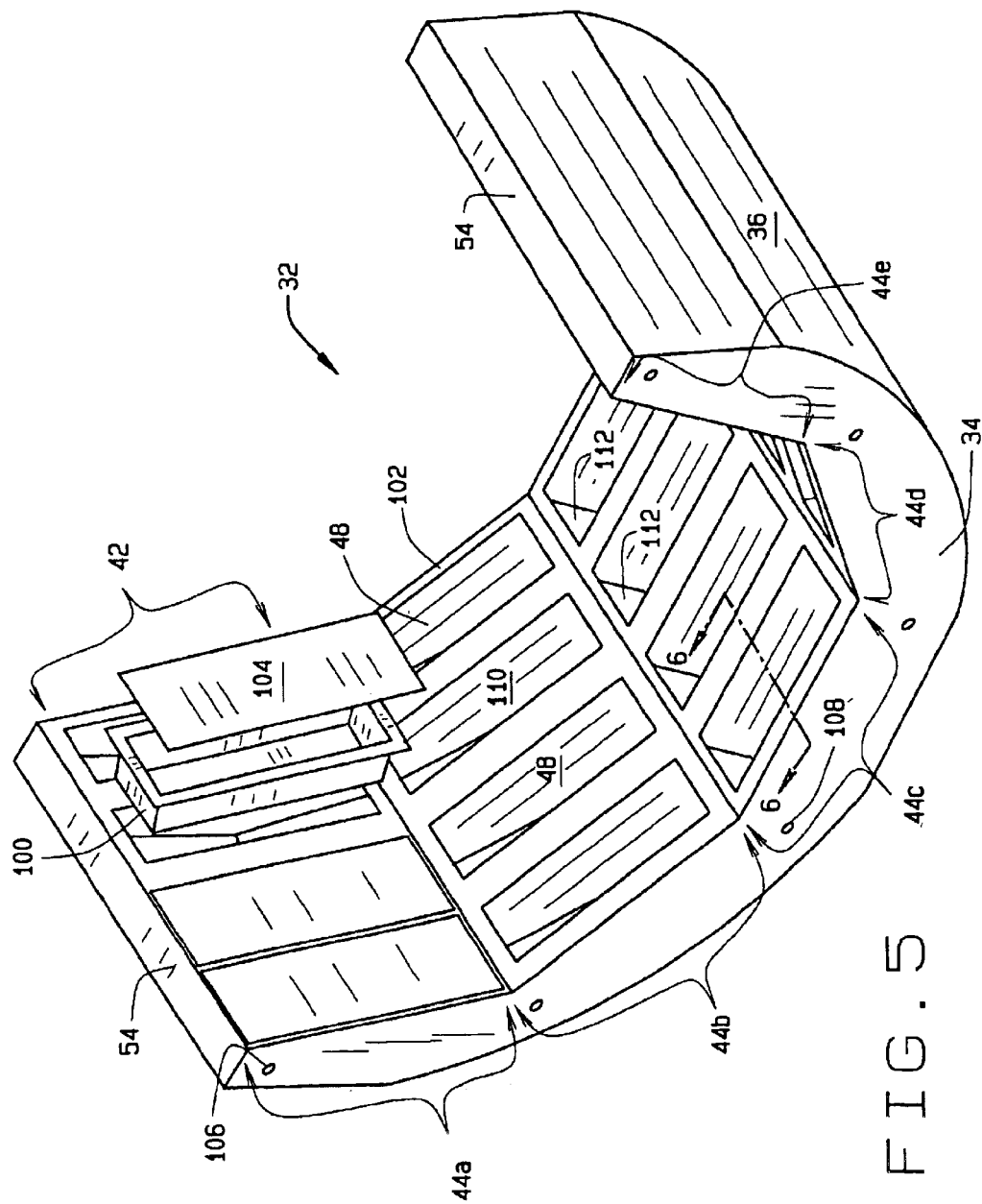
FIG. 5 is a perspective view of a carrier module configured according to one embodiment of the present invention.

The module(s) 32 can be configured in a variety of ways for carrying one or a plurality of payloads. For example, a module 32 can be configured as shown in FIG. 5. The compartments 48 are useful for carrying boxes 100 for storing, e.g., science experiments, getaway specials (GASs), avionics black boxes, and tool boxes for extravehicular activities (EVAs). A box 100 can be secured to interface flanges 102 surrounding a compartment opening 46 and can be covered by a lid 104 secured to the box 100 and flanges 102. Also shown schematically in FIG. 5 are end-wall upper and lower interconnects 106 and 108 for interconnecting modules 32 as further described below.

As shall be further described below, the rows 44 of compartments 48 are defined by a support structure between the outer wall 36 and faces 42. Each compartment row 44 is defined transversely by the end walls 34 and interior walls 110 between the end walls 34. Each row 44 is defined longitudinally by a plurality of rib walls 112 and, in the case of two outer rows 44a and 44e, by the module upper edges 54. It should be noted that although the embodiment shown in FIG. 5 includes a plurality of transverse interior walls 110 separating compartments 48 in each row 44, an embodiment described further below has only one interior wall 110 per row 44.

Figure 6:
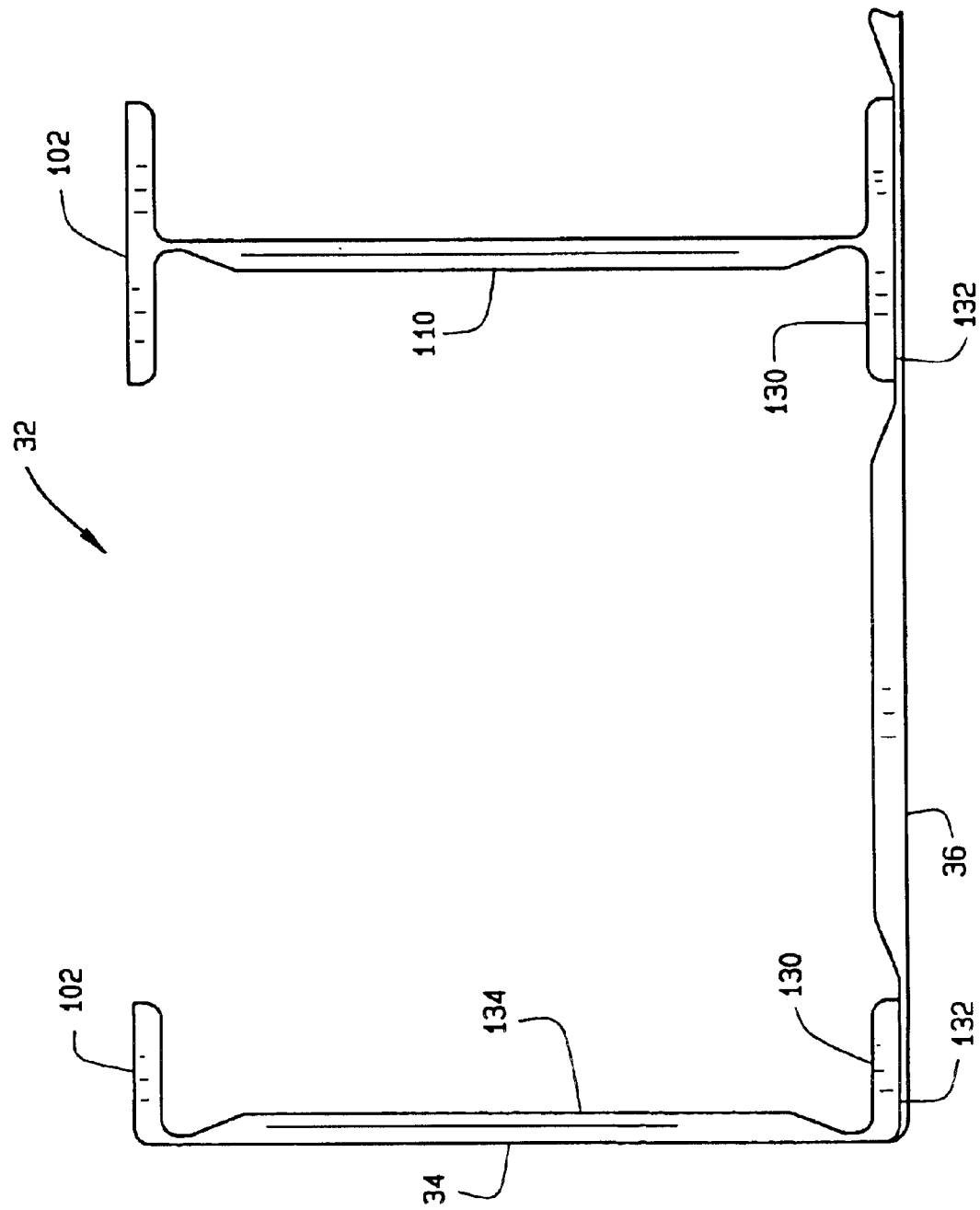
FIG. 6 is a cross-sectional partial view of an embodiment of a carrier module, with a rib wall removed, taken along the plane indicated by line 6—6 in FIG. 5.

FIG. 6 is a cross sectional partial view of the module 32 taken along the plane indicated by line 6—6 in FIG. 5, shown without rib walls 112. The module 32 is fabricated using a composite material, for example, carbon/epoxy, laminated together with, e.g., ½-inch vented aluminum honeycomb or other material that provides stability. The module 32 is fabricated using a space-qualified epoxy system. The end walls 34 and interior wall(s) 110 are fabricated of ±45° carbon fabric shear web. The shear web is cured with the interface flanges 102 and with bottom caps 130, which are fabricated using high-modulus carbon unidirectional ("uni") fabric. The outer wall 36 is laminated with isotropic skin laminate.

Figure 7:
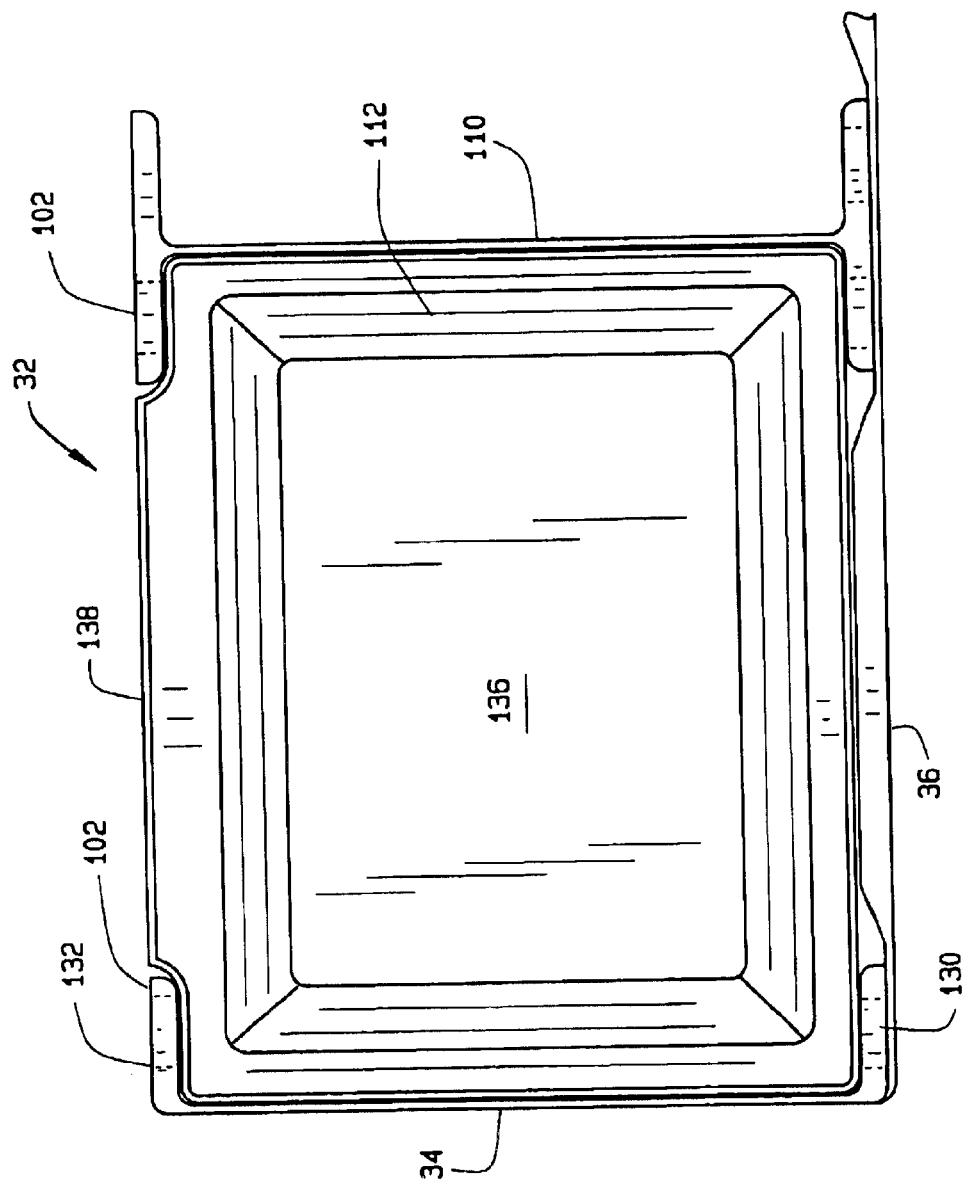
FIG. 7 is a cross-sectional partial view of a carrier module according to one embodiment of the present invention.

The bottom caps 130 are bonded to the outer wall 36 by anti-peel fasteners 132. The outer wall 36, each end wall 34 and each interior wall 110 have thickened mid-portions 134. A rib wall 112 is bonded in place, e.g., between walls 34 and 110 (shown in FIG. 6), by anti-peel fasteners 132 as shown in FIG. 7. Each rib wall 112 also has a thickened mid-portion 136 and an upper flange 138 that forms part of an interface flange 102 for a compartment 48 as shown in FIG. 5.

Figure 8:
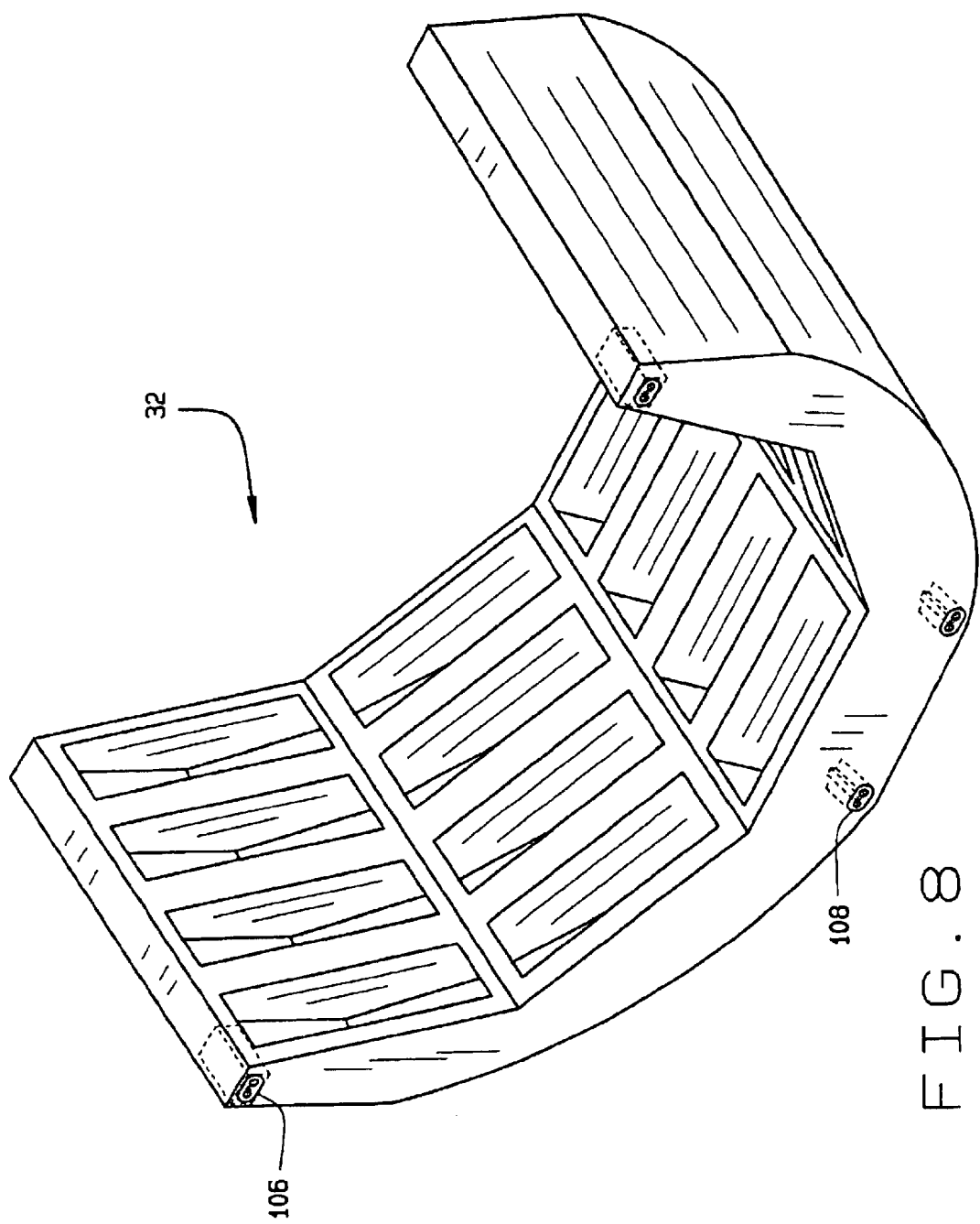
FIG. 8 is a perspective view of an embodiment of a carrier module including interconnect fittings.
Figure 9:
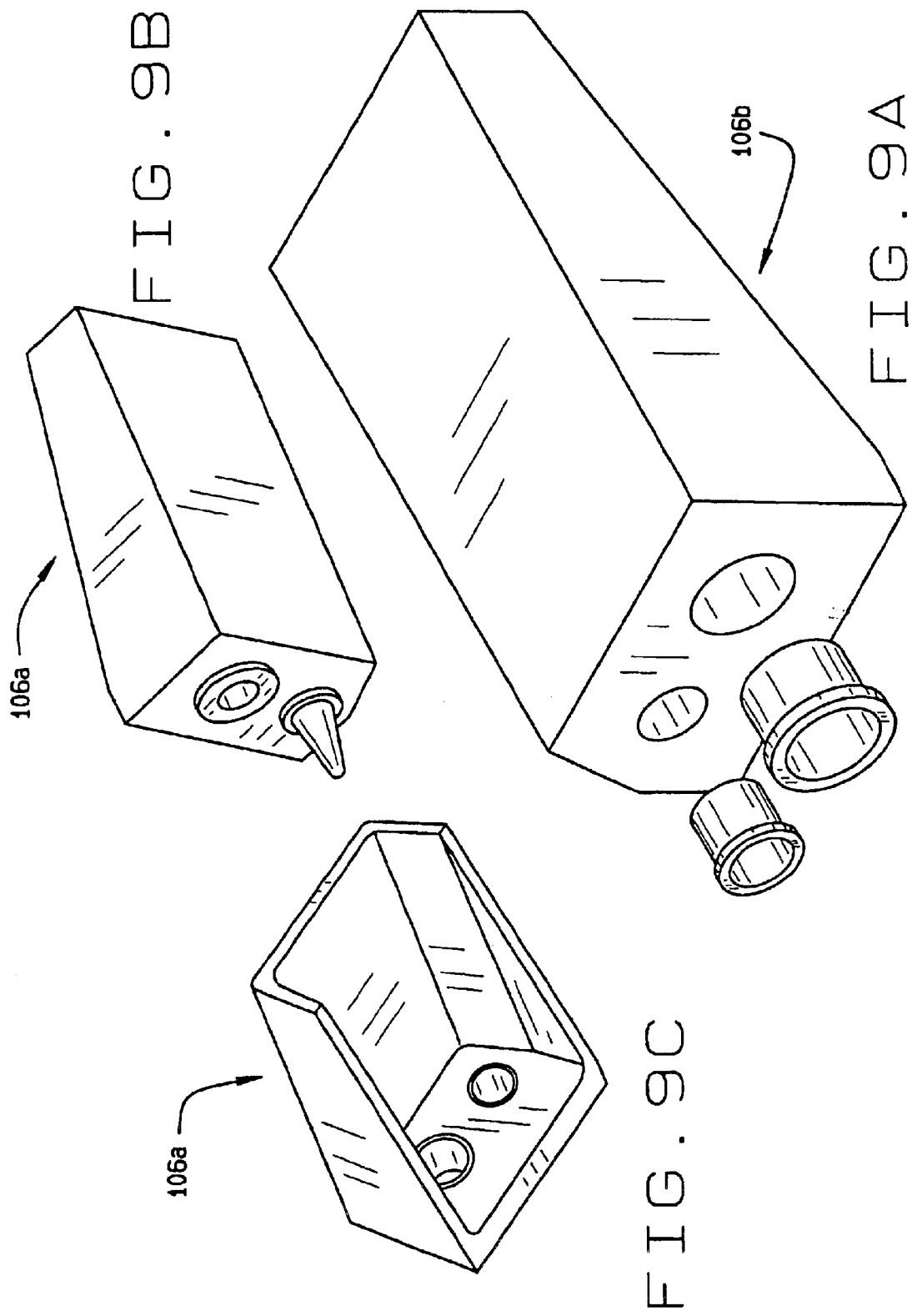
FIG. 9A is an exploded perspective view of an upper interconnect fitting according to one embodiment of the present invention.
FIG. 9B is a perspective view of an upper interconnect fitting according to one embodiment of the present invention.
FIG. 9C is a perspective view of an upper interconnect fitting according to one embodiment of the present invention.
Figure 10:
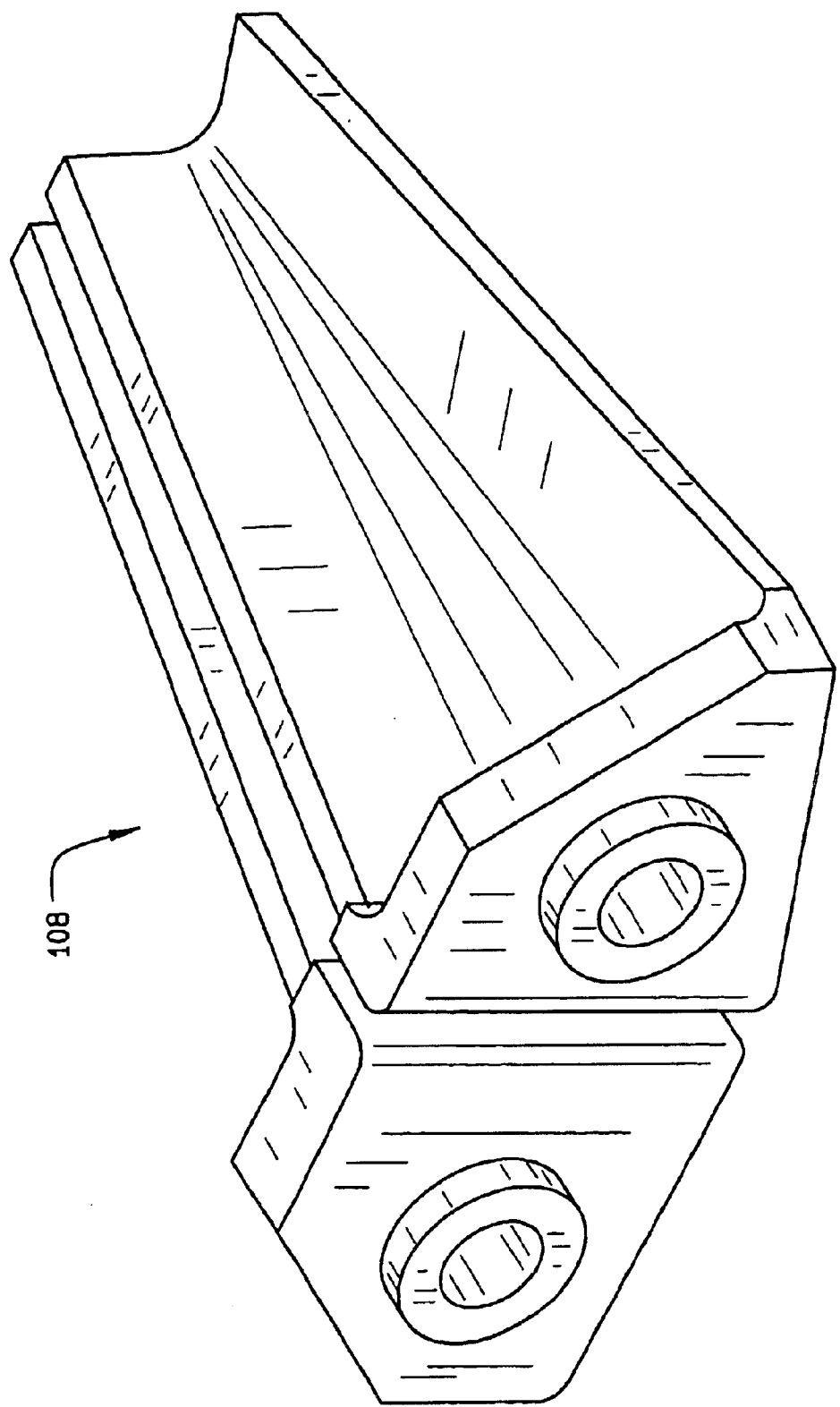
FIG. 10 is a perspective view of an lower interconnect fitting according to one embodiment of the present invention.

Two carrier modules can be joined together using upper and lower interconnect fittings, indicated respectively by reference numbers 106 and 108 in FIG. 8. The fittings 106 and 108 are, for example, fabricated of NC (numerical-control) milled aluminum. An upper interconnect fitting 106 is shown in greater detail in FIGS. 9A, 9B and 9C. A lower interconnect fitting 108 is shown in greater detail in FIG. 10.

Figure 11:
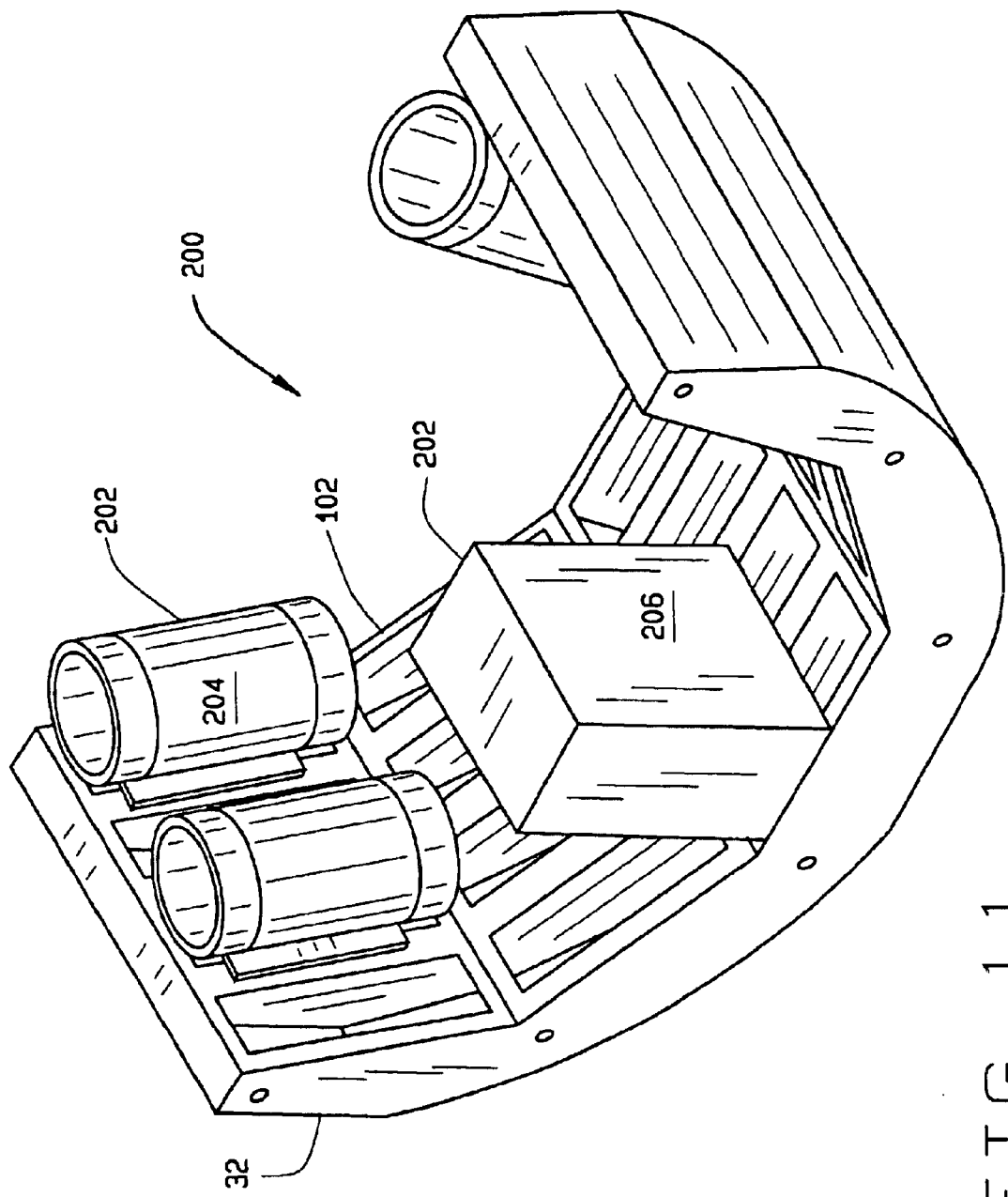
FIG. 11 is a perspective view of a carrier module configured according to one embodiment of the present invention.
Figure 12:
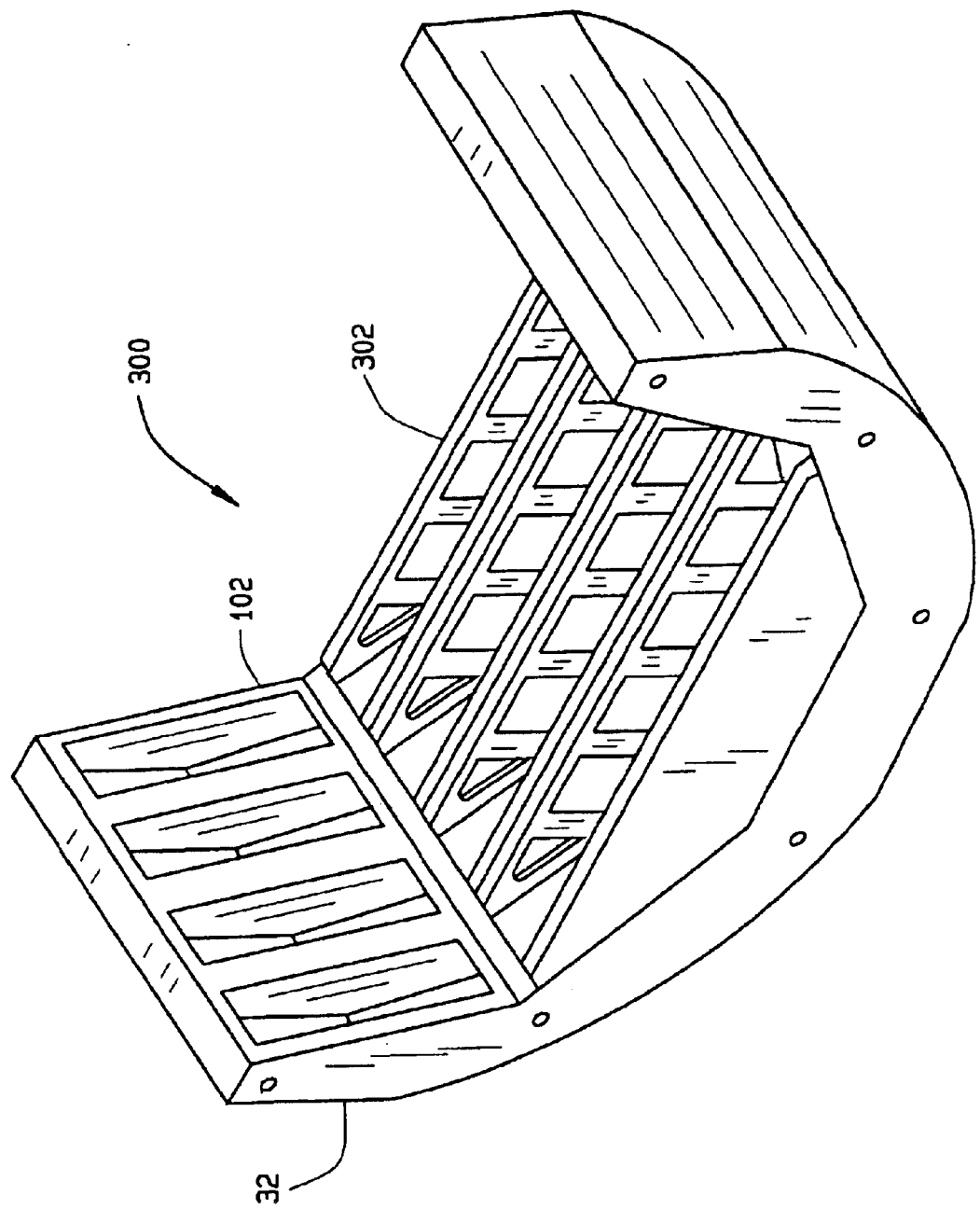
FIG. 12 is a perspective view of a carrier module configured with bulkheads according to one embodiment of the present invention.

Another configuration of the module 32 is indicated generally by reference number 200 in FIG. 11. A plurality of payloads 202 can be secured to module interface flanges 102. The payloads can include GAS canisters 204 and payloads, such as the payload 206, that do not fit inside a compartment 48. FIG. 12 illustrates a module configuration 300 in which a plurality of modular bulkheads 302 are used.

Figure 13:
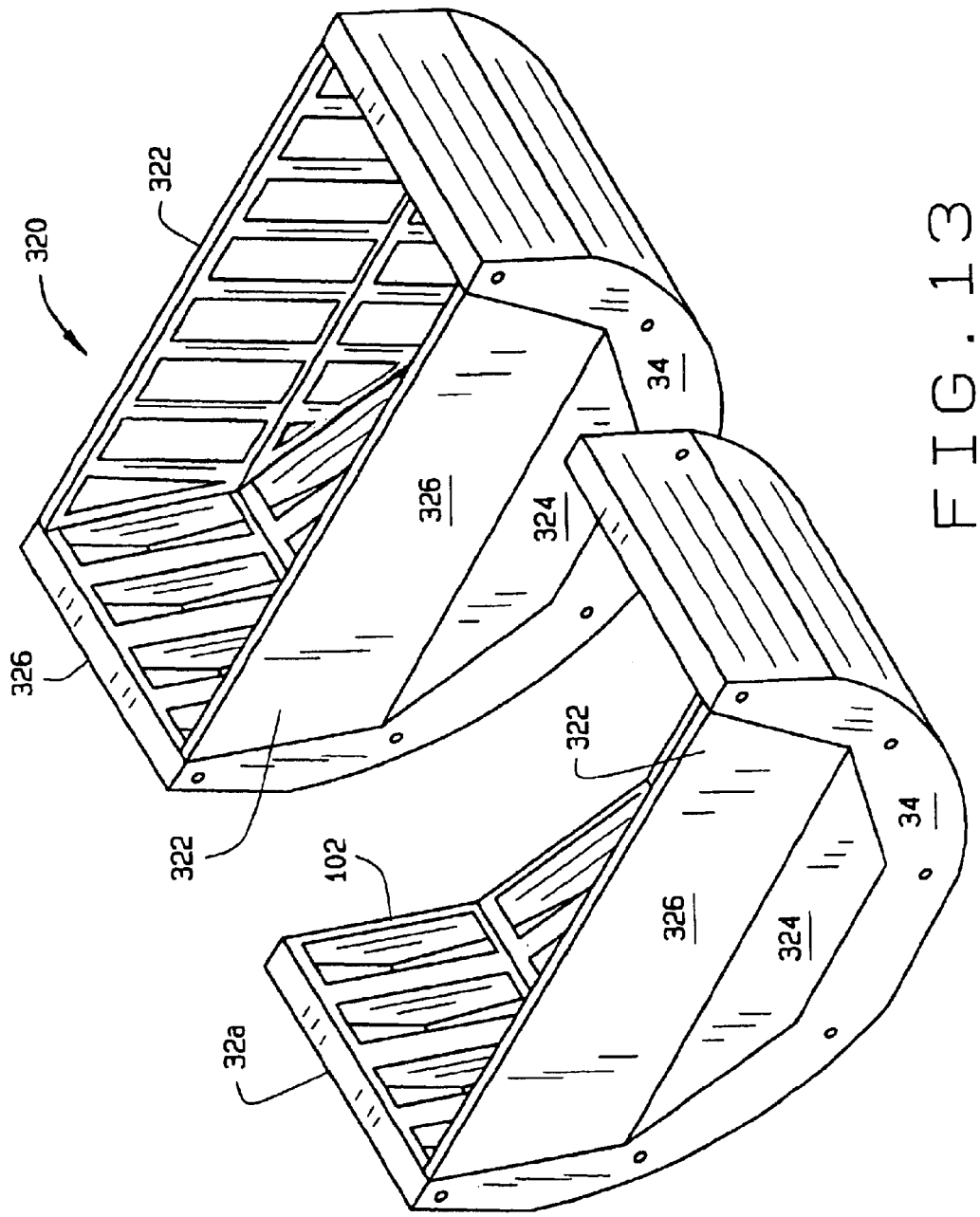
FIG. 13 is a perspective view of two carrier modules configured with bulkheads according to embodiments of the present invention.

The bulkheads 302 are secured to interface flanges 102 and are used, for example, to support a shelf (not shown). FIG. 13 illustrates another configuration 320 in which modular bulkhead assemblies 322 are used. A module 32a includes a bulkhead assembly 322 having lower and upper sections 324 and 326 secured to interface flanges 102 atop an end wall 34. A module 32b includes two assemblies 322. The assemblies 322 can be used to contain and/or cantilever a large payload (not shown).

Figure 14:
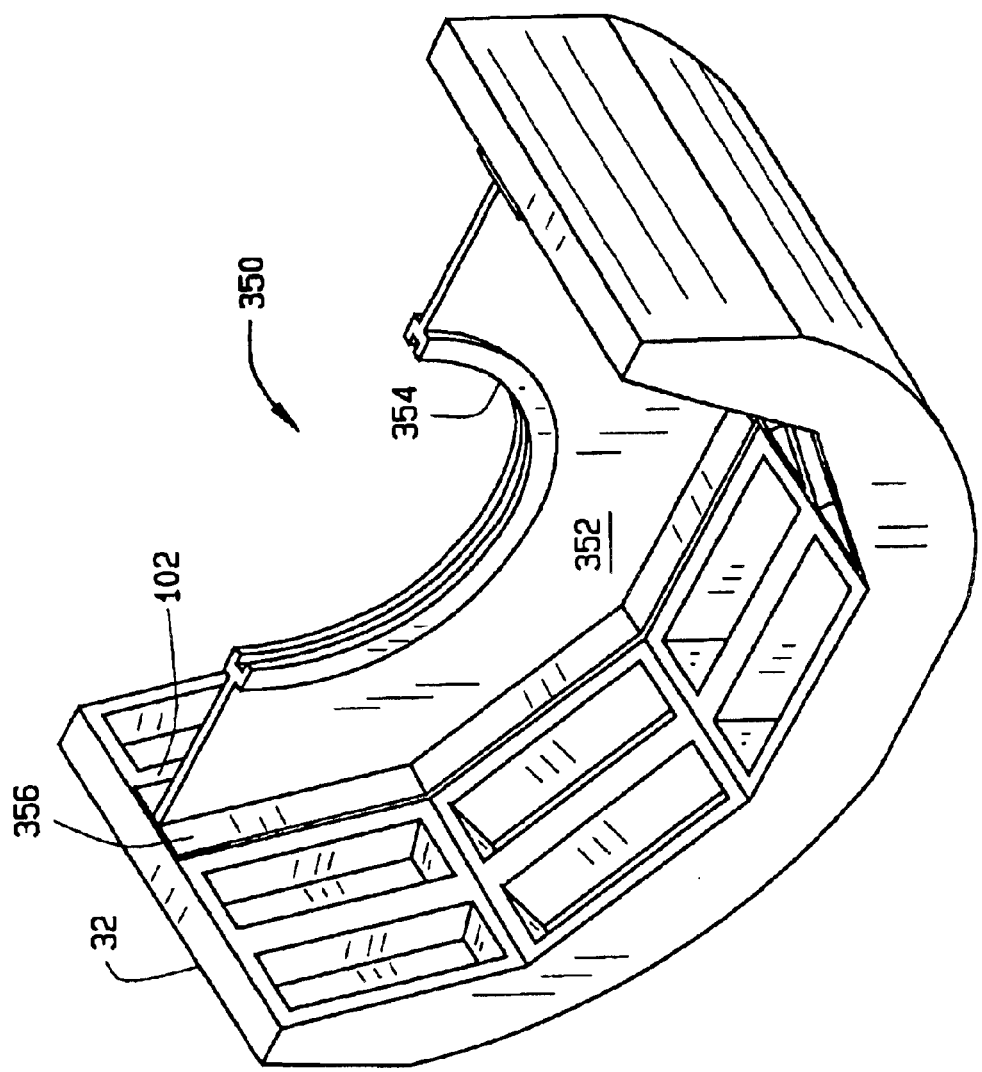
FIG. 14 is a perspective view of a carrier module configured with a bulkhead for supporting a deployable payload according to one embodiment of the present invention.

It can be seen from FIGS. 12 and 13 that bulkheads and bulkhead assemblies can be configured in various ways to support various types of payloads. Another exemplary module configuration, indicated generally by reference number 350 in FIG. 14, is used to support a deployable payload (not shown). A bulkhead 352 is shaped to conform to the payload shape and is reinforced along an upper edge 354. The bulkhead 352 has a plurality of interfaces 356 for supporting the bulkhead and for securing it to interface flanges 102.

Figure 15:
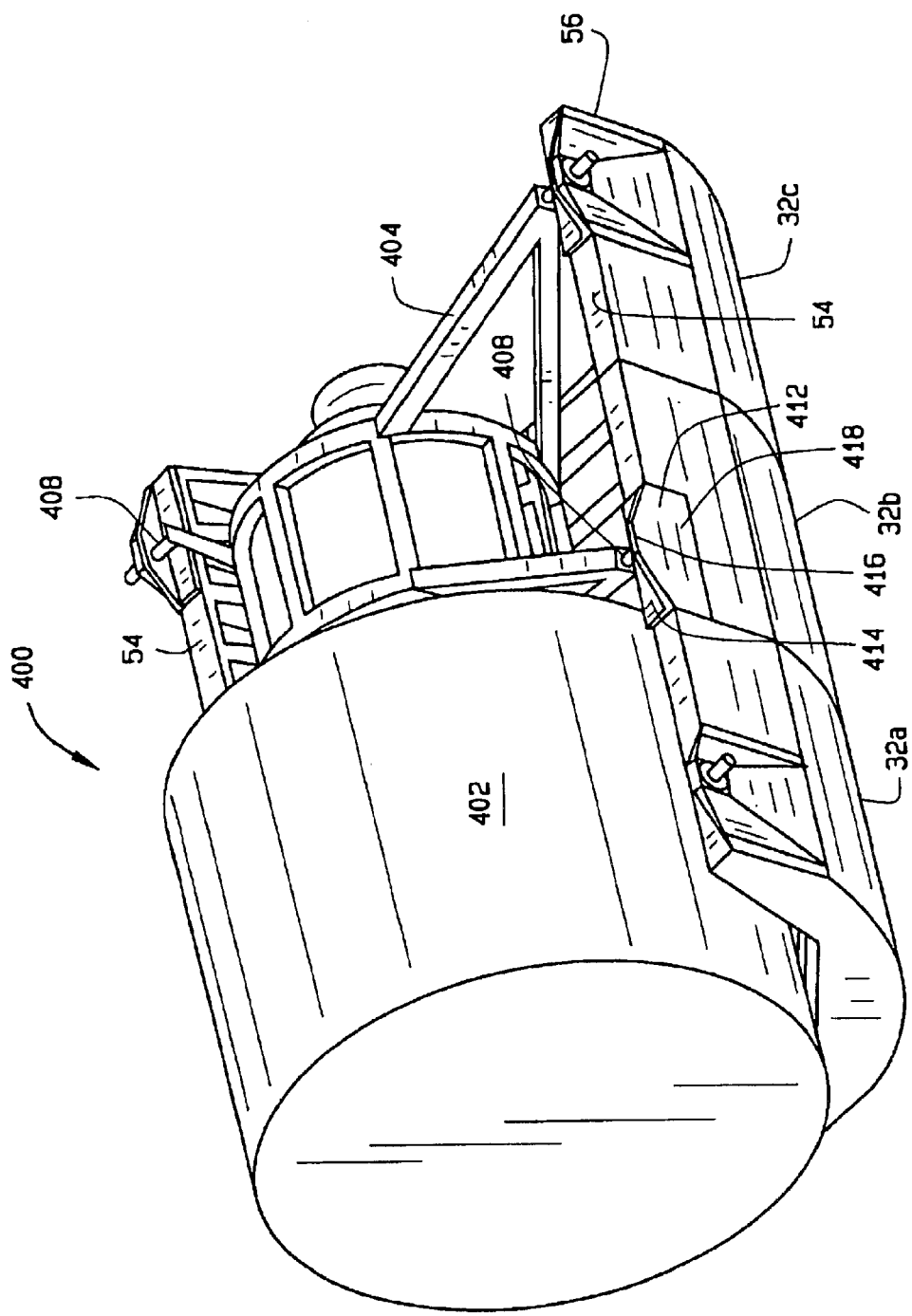
FIG. 15 is a perspective view of a carrier holding a deployable payload according to one embodiment of the present invention.

Another carrier configuration, indicated generally by reference number 400 in FIG. 15, includes three modules 32 and holds a deployable payload 402. The carrier modules 32a and 32c are secured to the payload bay 12 by trunnion fittings 56 as described with reference to FIG. 2. The payload 402 is supported in the carrier modules 32 by a support frame 404. The support frame 404 has a plurality of payload trunnions 408 that rest on the carrier edges 54 and by which the frame 404 can be secured to the carrier modules 32 by latches (not shown), for example, standard launch vehicle active latches 26.

Two payload trunnion fittings 412 (one of which can be seen in FIG. 15) are secured to the carrier upper edges 54. Each payload trunnion fitting 412 includes a lip 414 positionable on an upper edge 54, and a trunnion tower 416 extending upwardly from the lip 414. A bracket 418, by which the fitting 412 is secured to the carrier, extends downwardly and flush against the carrier module 32b. The trunnion tower 416 and lip 414 are configured so as to allow an active latch 26 (shown in FIG. 1) to be attached to secure the payload trunnion 412 to the carrier module 32b.

Figure 16:
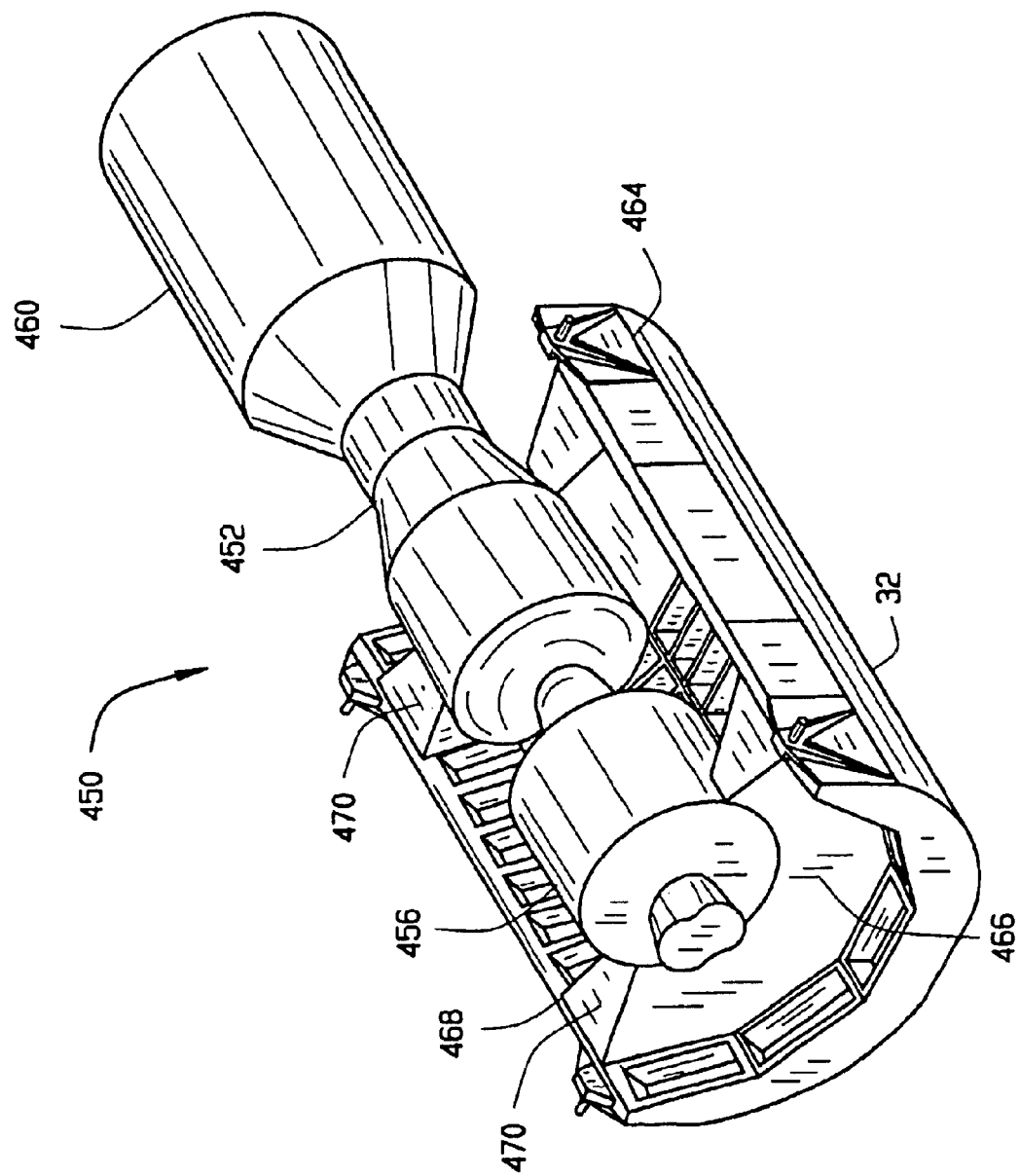
FIG. 16 is a perspective view of a carrier holding a deployable payload according to one embodiment of the present invention.

Another carrier configuration, indicated generally by reference number 450 in FIG. 16, includes three modules 32. The carrier modules 32 hold a deployable payload 452, e.g. a motor case 456 and a spacecraft payload 460 cantilevered past an end 464 of the carrier. The carrier modules 32 can be secured to the payload bay 12 by trunnion fittings 56 as described with reference to FIG. 2. The motor case 456 is supported in the carrier by two generally U-shaped bulkheads 466. A plurality of payload trunnion mounts 468, attached to the motor case 456, engage into active latches 26 attached to upper shelves 470 of the bulkheads 466, thereby securing the motor case 456 to the carrier modules 32.

Figure 17:
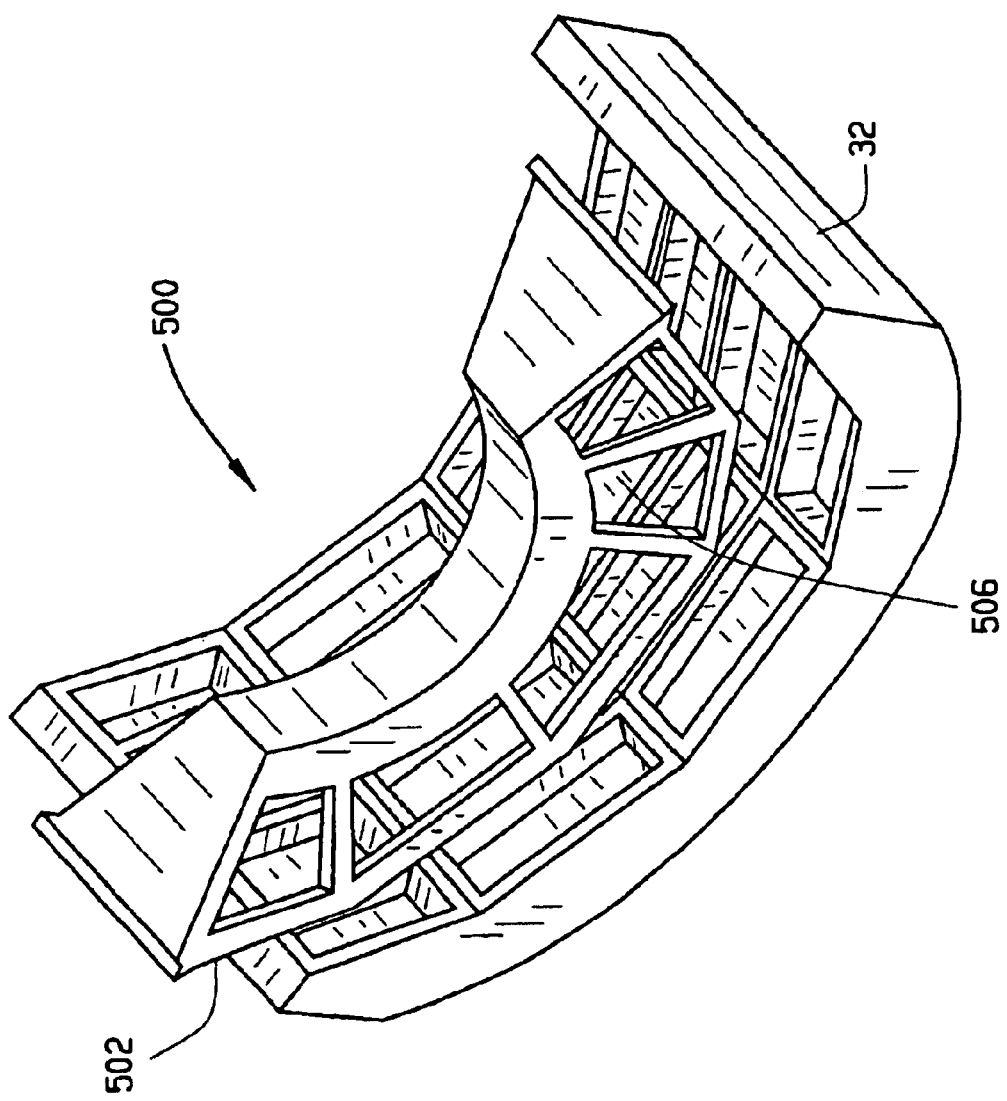
FIG. 17 is an exploded perspective view of a carrier module configured with a bulkhead for supporting a deployable payload according to one embodiment of the present invention.

FIG. 17 is an exploded perspective view of another module embodiment, indicated generally by reference number 500. A support bulkhead 502 include shear webs 504 from which sections have been cut away to form holes 506, thus facilitating access to the payload(s) and reducing weight of the carrier.

Figure 18:
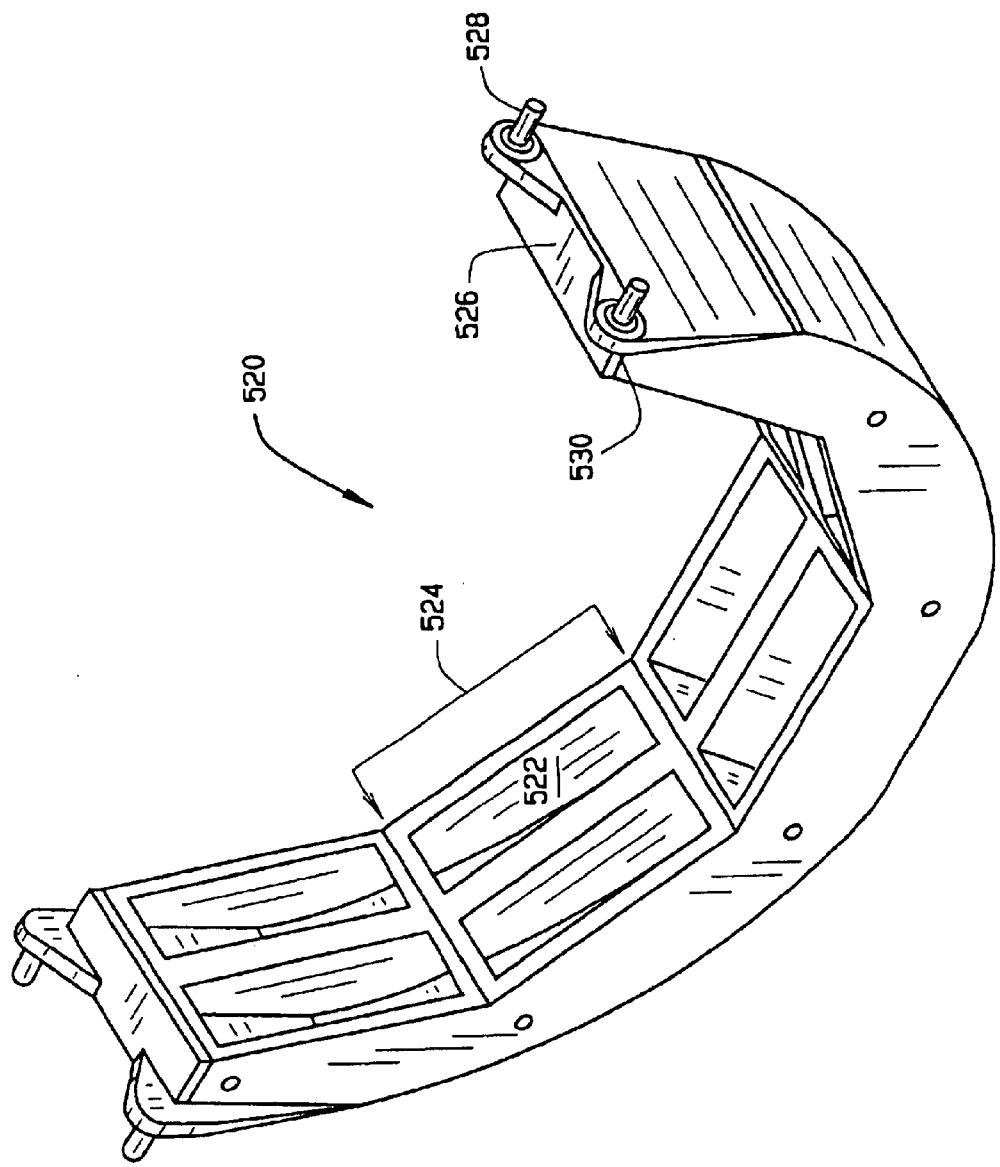
FIG. 18 is a perspective view of a carrier module according to one embodiment of the present invention.

Another embodiment of a carrier module is indicated generally by reference number 520 in FIG. 18. The module 520 includes two compartments 522 in each face 524. Trunnion fittings 526 are used to secure the module 520 to the payload bay 12. Each fitting 526 includes two trunnions 528 spaced along upper edges 530 of the module 520. Two modules 520 can fit, for example, in the same payload bay space that would be occupied by the module 32 (shown in FIG. 5).

Figure 19B:
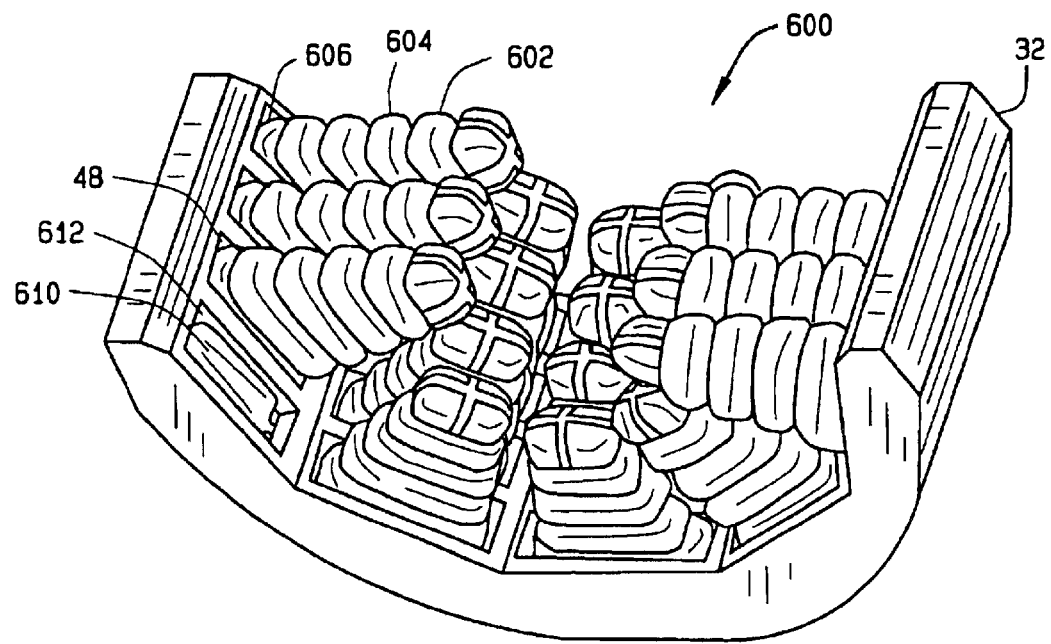
FIG. 19B is a perspective view of an airbag system deployed in a payload carrier according to one embodiment of the present invention.
Figure 19A:
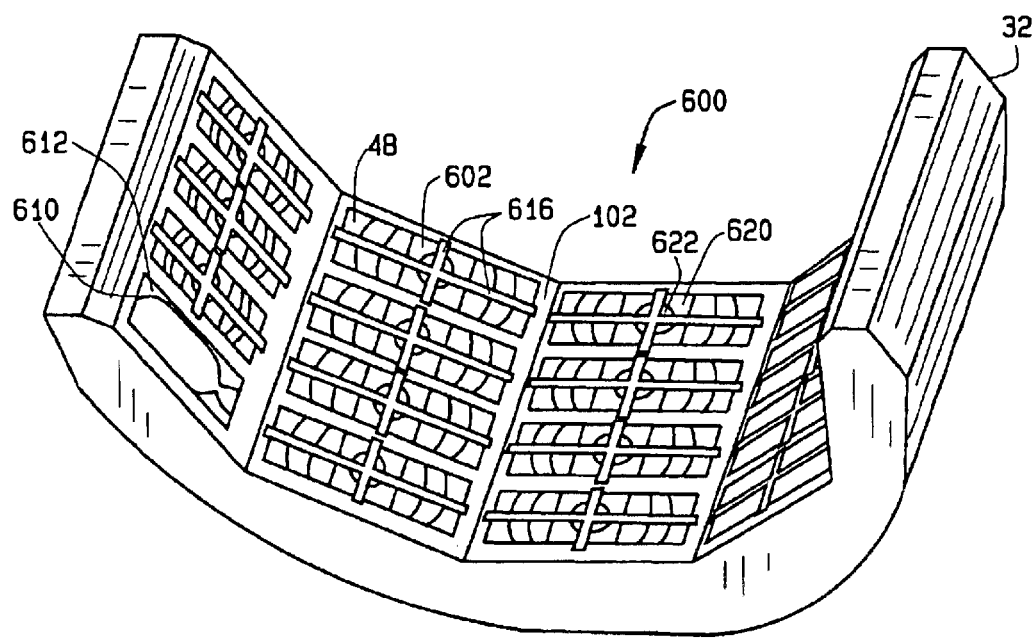
FIG. 19A is a perspective view of an airbag system stowed in a payload carrier according to one embodiment of the present invention.

Embodiments of the above described carrier can be equipped to protect the structure of a launch vehicle from a potential impact of a payload in the event of an impact. For example, an airbag system according to one embodiment is referred to generally by reference number 600 in FIGS. 19A and 19B. FIG. 19A is a perspective view of the airbag system 600 stowed in a carrier module 32. FIG. 19B is a perspective view of the airbag system 600 deployed in the module 32.

The airbag system 600 includes a plurality of pneumatically interconnected bag assemblies 602 mounted in compartments 48 of the carrier. Each bag assembly 602 includes a plurality of physically and pneumatically interconnected bags 604. The bags 604 gradually decrease in size with increasing proximity to a payload (not shown). The largest, i.e. the bottom, bag 606 in each assembly is mounted in the corresponding compartment 48. The number and sizes of bags 604 preferably are the same for all of the bag assemblies. It is also contemplated that in other embodiments, the bags 604 could have different shapes and/or sizes for specific configurations.

A pressure source such as a pressurized gas bottle 610 is located, for example, in an end row compartment 612 of the carrier. The pressure source 610 in one preferred embodiment is a 3295-psi, 1200 cubic-inch-capacity Kevlar-epoxy gas cylinder having a pressure-sensitive control valve (not shown) and containing pure dry nitrogen. A staged regulator (not shown) may be used to control bag inflation. The bags 604 and/or bag assemblies 602 can be deployed simultaneously or selectively as further described below.

As shown in FIG. 19A, each bag assembly 602 is stowed and secured inside its compartment 48 during launch by a plurality of Velcro™ strips 616 attached to an access plate 620 and to carrier interface flanges 102. Alternatively, cover flaps (not shown) or other mechanisms for restraining the bag assemblies 602 may be used. The Velcro™ strips 616 also can be used to control the order of inflation of the bags as further described below. The access plate 620 includes a vacuum port 622 for bag assembly evacuation.

A bag assembly 602 is shown in greater detail in FIG. 20A. A large number of bags 604, for example, six bags 604 stacked as shown in FIG. 20A, are preferred, although other numbers of bags also are contemplated. Tapering the bag sizes in an assembly, as described above, serves to reduce static force that would be applied to a payload on impact. In order to provide sufficient bearing area so that the bag assemblies do not buckle on impact, a taper ratio of about 0.25 is provided. A taper ratio is defined as a ratio of an area of a top bag 626 to an area of a bottom bag 606 for a particular overall height of the assembly 602.

The access plate 620 atop the assembly 602 is used for sealing a grommet (not shown) on the top bag 626. Access into the bag assembly 602 via the grommet is provided for making pneumatic interconnections among the bags 604, bag assemblies 602, the pressure source 610 and/or rupture disk mount(s) as further described below. A Velcro™ restraint attachment or tab 628 on at least one side 630 of each bag 604 is configured for connection with a Velcro™ strip 616 for use in controlling deployment of the bags as further described below.

FIG. 20B is a cross sectional view of the bag assembly 602. Each bag 604 includes an internal spar 632 that serves to retain the shape of the bag and to minimize off-axis movement of the bag assembly 602 in the event of sideloading. The bottom bag 606 in a bag assembly 602 includes a fill port 634 through which gas from the pressure source 610 can flow into the bag assembly. The bag assemblies 602 are pneumatically interconnected, preferably via a plurality of independent gas flow paths (not shown) so as to minimize inflation time and to control pressure levels during deployment. In each flow path, interconnections among bag assemblies 602 may be provided, for example, among bag assemblies 602 in each module row 44, to form parallel subpaths for gas flow.

A rupture disk mount 636, in which a rupture disk 638 is mounted, preferably is provided at each of a plurality of locations, e.g. at an end of a flow path and/or, as shown in FIG. 20B, in a bottom bag 606 and the outer wall 36 of the carrier. A rupture disk 638 is sized to rupture at a predetermined pressure spike to prevent rebound of a payload and to discharge impact energy. Rupture disk(s) 638 can be used for providing a desired gas flow pattern and/or inflation sequence during deployment of the system 600. For example, referring to FIG. 5, bag assemblies 602 could be configured in the middle three rows 44b, 44c and 44d of the module 32 to inflate first upon an abort signal as further described below. The bag assemblies in the middle rows could be coupled with bag assemblies 602 in the two end rows 44a and 44e via rupture disks 638. In the event of impact, bag assemblies in the middle rows 44b, 44c and 44d would relieve impact energy into the still un-inflated assemblies in the end rows 44a and 44e. In other embodiments, one or more check valves and/or orifices may be used in place of, or in addition to, rupture disk(s) for providing a desired flow pattern and/or deployment timing.

The bags 604 are preferably fabricated of a puncture-resistant material, for example, nylon coated on two sides with urethane. Such material preferably has a tensile strength of about 180 pounds per inch in a fill direction and about 280 pounds per inch in a warp direction. A base fabric is, for example, a 79×59 plain-weave 210-denier nylon. Coated fabric has, for example, a weight of 11.2 ounces per square yard. For system deployment at temperatures less than about −60 degrees F. (−51 degrees C.), a silicone coating may be preferable.

Before launch, the system 600 is initially evacuated via the vacuum port 622. Because the bag assemblies 602 are restrained in compartments 48, premature inflation due to any residual gas is prevented as environmental pressure drops. Upon issuance of a signal to inflate, one or more pyrotechnic valves (not shown) are triggered which immediately cause the system 600 to begin to inflate. Upon commencement of inflation, the largest (bottom) bag 606 of the assembly 602 preferably inflates first, although another bag could be inflated first in other embodiments. The order of inflation of bags in an assembly can be controlled, for example, by selective arrangement of the Velcro™ strips 616 to inhibit inflation of selected bag(s). As a bag assembly inflates, a strip 616 pulls apart from the associated tab 628 when a predetermined pressure level is reached.

The bags 604 can be allowed to inflate until they touch the payload. In other embodiments, inflation is stopped before the bags reach contact with the payload. After an impact, the bags 604 are allowed to vent inside the payload bay upon reaching a predetermined maximum pressure. Venting can attenuate impact energy from the payload and reduce potential rebound.

Figure 21:
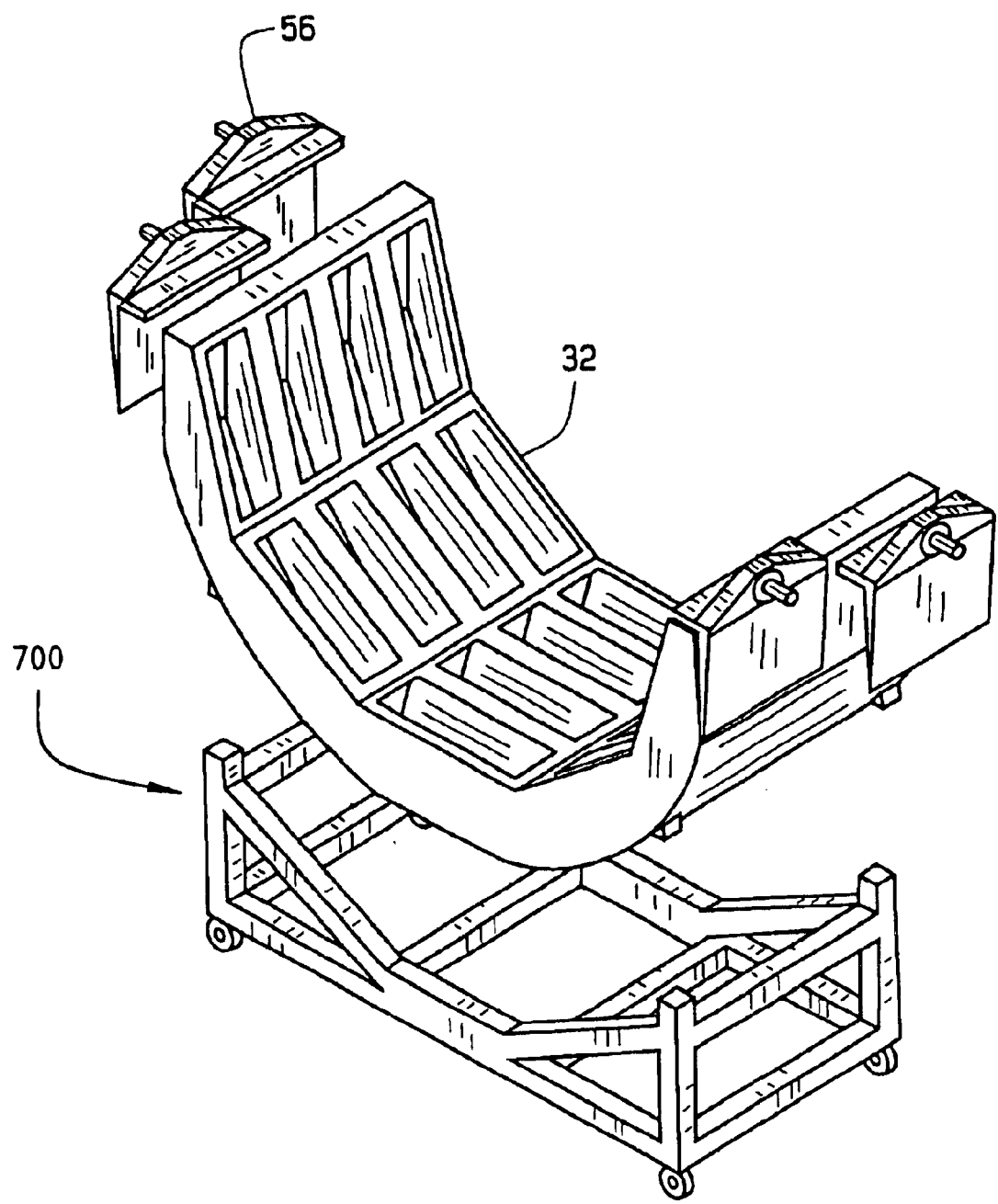
FIG. 21 is an exploded perspective view of a carrier and a support platform for loading a carrier, according to one embodiment.

Embodiments of the above described carrier can be loaded and prepared for a launch separately from the launch vehicle, for example, at one or more geographical locations. Modules can be separately prepared for flight and integrated with other modules and a launch vehicle at a launch site. For example, a module 32 can be loaded while resting on a movable support platform, indicated generally by reference number 700 in FIG. 21. The modular trunnion fittings 56 can be installed prior to launch, without modification or special testing, to secure the carrier in a payload bay. The carrier 30 also can be configured to provide avionics and other services to payloads, as described in co-pending U.S. patent application entitled "System and Methods For Integrating a Payload With a Launch Vehicle", Attorney Docket No. 7784-000467, filed on Jul. 23, 2002, the description of which is incorporated herein by reference in its entirety.

The interrelationship of the carrier walls and/or bulkheads as described above provides triangulation of structure that resists axial loading, for example, by deployable payloads. The composite material(s) used in fabricating the module are light yet provide strength to the carrier.

The above described airbag system is reusable after some refurbishment and thus provides easy and quick turnaround after an inflation event. Where all bag assemblies are of the same size for mounting in compartments of the carrier, airbag stowage is simplified, and the airbag system can be easily secured for launch. The tapering of bag assemblies reduces system mass while increasing a volume-to-surface area ratio. Additionally, a controlled airbag deployment of predetermined shape, which offers minimum bearing load to the payload, can be achieved. When bag assemblies in carrier end rows are inflated as described above, payload rebound due to landing loads can be prevented by the quick dispersal of impact energy and by the formation of obstruction in the path of the potential rebound. No external venting is needed, and the venting of impact energy by the airbag system is virtually unaffected by rapid changes to environmental pressure. Thus, although components of the airbag system can be standardized to handle a variety of payloads, operation of the system can be tailored for a particular payload.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A modular payload carrier for use in a launch vehicle, the carrier comprising at least one module configured to fit in a payload bay of the vehicle, the module having an end wall attachable to an end wall of another module configured to fit in the bay, the module comprising an outer wall contoured generally to fit a bottom surface contour of the bay, the module further comprising an inner wall having a plurality of segments, each segment having a row of compartments configured to hold payloads between the inner and outer walls, each compartment having an opening through the inner wall for receiving a payload;

wherein the inner wall comprises a plurality of interface flanges surrounding the compartment openings.

2. The payload carrier of claim 1 further comprising a modular bulkhead assembly having at least one bulkhead selectively attachable to an interface flange.

3. A modular payload carrier for use in a launch vehicle, the carrier comprising:

at least one module configured to fit in a payload bay of the vehicle, the module having an end wall attachable to an end wall of another module configured to fit in the bay, the module comprising an outer wall contoured generally to fit a bottom surface contour of the bay;

a pair of upper edges connecting the module inner and outer walls; and a plurality of trunnion fittings selectively spaced along the upper edges for attachment thereto, each trunnion fitting comprising a trunnion configured to be secured to the bay at a selected attachment point.

4. The payload carrier of claim 3 wherein the trunnion fitting further comprises:

a lip configured to be selectively positioned en an upper edge of the carrier;

a tower extending from the lip and supporting the trunnion; and a bracket comprising a flat face configured to abut the outer wall for attachment to the carrier.

5. A modular payload carrier for use in a launch vehicle, the carrier comprising:

at least one module configured to fit in a payload bay of the vehicle, the module having an end wall attachable to an end wall of another module configured to fit in the bay, the module comprising an outer wall contoured generally to fit a bottom surface contour of the bay; and an airbag system configurable in at least one module, the system comprising a plurality of baa assemblies selectively stowed in compartments of the module.

6. The payload carrier of claim 5 wherein each bag assembly comprises a stack of interconnected bags configured to deploy toward a payload.

7. The payload carrier of claim 6 wherein the stack comprises a tapered shape.

8. The payload carrier of claim 6 further comprising a plurality of restraint straps selectively configurable to control deployment of a bag of the bag assembly.

9. A modular payload carrier for use in a launch vehicle, the carrier comprising:

at least one module configured to fit in a payload bay of the vehicle, the module having an end wall attachable to an end wall of another module configured to fit in the bay, the module comprising an outer wall contoured generally to fit a bottom surface contour of the bay; and an airbag system configurable in at least one module, the system comprising a plurality of bag assemblies selectively deployable from compartments of the module.

10. A modular payload carrier for use in a launch vehicle, the carrier comprising at least one module configured to fit in a payload bay of the vehicle, the module comprising:

an outer wall contoured generally to fit a bottom surface contour of the bay; and a plurality of compartments defined between an inner wall and the outer wall in a plurality of rows, each row defined by a pair of end walls and one or more interior walls of the module, each compartment having an opening into the bay through the inner wall;

wherein the module comprises an airbag system stowed in plurality of the compartments, the system comprising a plurality of bags selectively configured to deploy in a predetermined sequence.

11. A modular payload carrier for use in a launch vehicle, the carrier comprising:

at least one module configured to fit in a payload bay of the vehicle and attachable to at least one other module configured to fit in the bay, the module comprising an outer wall contoured generally to fit a bottom surface contour of the bay;

a pair of upper edges connecting the module inner and outer walls; and a plurality of trunnion fittings selectively spaced along the upper edges for attachment thereto, each trunnion fitting comprising:

a trunnion configured to be secured to the bay at a selected attachment point;

a lip configured to be selectively positioned on an upper edge of the carrier;

a tower extending from the lip and supporting the trunnion; and a bracket comprising a flat face configured to abut the outer wall for attachment to the carrier.

12. A modular payload carrier for use in a launch vehicle, the carrier comprising:

at least one module configured to fit in a payload bay of the vehicle and attachable to at least one other module configured to fit in the bay, the module comprising an outer wall contoured generally to fit a bottom surface contour of the bay; and an airbag system configurable in at least one module, the system comprising a plurality of bag assemblies selectively stowed in compartments of the module.

13. The payload carrier of claim 12 wherein each bag assembly comprises a stack of interconnected bags configured to deploy toward a payload.

14. The payload carrier of claim 13 wherein the stack comprises a tapered shape.

15. The payload carrier of claim 13 further comprising a plurality of restraint straps selectively configurable to control deployment of a bag of the bag assembly.

16. A modular payload carrier for use in a launch vehicle, the carrier comprising:

at least one module configured to fit in a payload bay of the vehicle and attachable to at least one other module configured to fit in the bay, the module comprising an outer wall contoured generally to fit a bottom surface contour of the bay; and an airbag system configurable in at least one module, the system comprising a plurality of bag assemblies selectively deployable from compartments of the module.

17. A modular payload carrier for use in a launch vehicle, the carrier comprising at least one module configured to fit in a payload bay of the vehicle, the module comprising:

an outer wall contoured generally to fit a bottom surface contour of the bay;

a plurality of compartments defined between an inner wall and the outer wall, each compartment having an opening into the bay through the inner wall; and an airbag system stowed in a plurality of the compartments, the system comprising a plurality of bags selectively configured to deploy in a predetermined sequence.

* * * * *